(12) United States Patent
Rodriguez et al.

(10) Patent No.: US 11,807,301 B2
(45) Date of Patent: Nov. 7, 2023

(54) VEHICLE

(71) Applicant: Polaris Industries Inc., Medina, MN (US)

(72) Inventors: William B. Rodriguez, Roseau, MN (US); John M. Nutter, Stacy, MN (US); Marc P. Vanderhoof, Osceola, WI (US); Michael D. Schneider, Princeton, MN (US)

(73) Assignee: Polaris Industries Inc., Medina, MN (US)

( * ) Notice: Subject to any disclaimer, the term of this patent is extended or adjusted under 35 U.S.C. 154(b) by 200 days.

(21) Appl. No.: 17/098,185

(22) Filed: Nov. 13, 2020

(65) Prior Publication Data

US 2022/0135132 A1    May 5, 2022

Related U.S. Application Data

(60) Provisional application No. 63/110,190, filed on Nov. 5, 2020.

(51) Int. Cl.
| | |
|---|---|
| *B62D 21/11* | (2006.01) |
| *B60N 2/01* | (2006.01) |
| *B60K 17/22* | (2006.01) |
| *B60G 7/00* | (2006.01) |
| *B60G 7/02* | (2006.01) |
| *B60G 3/20* | (2006.01) |

(52) U.S. Cl.
CPC .............. *B62D 21/11* (2013.01); *B60G 3/202* (2013.01); *B60G 7/008* (2013.01); *B60G 7/02* (2013.01); *B60K 17/22* (2013.01); *B60N 2/01* (2013.01); *B60G 2200/18* (2013.01); *B60G 2300/07* (2013.01)

(58) Field of Classification Search
CPC .... B62D 21/11; B62D 23/005; B62D 21/183; B60G 3/202; B60G 7/008; B60G 7/02; B60G 2200/18; B60G 2300/07; B60G 2200/1442; B60G 2200/422; B60G 2204/122; B60G 2204/143; B60G 7/001; B60G 2200/10; B60G 2200/13; B60K 17/22; B60N 2/01; B60Y 2200/124; B60Y 2400/72
See application file for complete search history.

(56) References Cited

U.S. PATENT DOCUMENTS

| | | |
|---|---|---|
| 2012/0031688 A1 | 2/2012 | Safranski |
| 2016/0238084 A1* | 8/2016 | Miller ...................... F16D 3/223 |

(Continued)

OTHER PUBLICATIONS

Invitation to Pay Additional Fees received for PCT Patent Application No. PCT/US2021/058210, dated Jan. 13, 2022, 2 pages.

(Continued)

*Primary Examiner* — Drew J Brown
(74) *Attorney, Agent, or Firm* — Faegre Drinker Biddle & Reath LLP

(57) ABSTRACT

A side-by-side vehicle is disclosed. The vehicle may include a rear, independent trailing arm suspension system and a drive train. The drive train may include an output from a power train coupled to a jack shaft to drive the vehicle. The jack shaft may be positioned entirely below the power train. A brake and sprocket may be positioned along the jack shaft. Additionally, the power train may be adjustably mounted to a frame of the vehicle.

29 Claims, 24 Drawing Sheets

(56) References Cited

U.S. PATENT DOCUMENTS

| | | |
|---|---|---|
| 2017/0136874 A1 | 5/2017 | Harris |
| 2019/0193501 A1 | 6/2019 | Brady |
| 2019/0210668 A1 | 7/2019 | Endrizzi et al. |
| 2020/0148207 A1* | 5/2020 | Fukazawa ............... F02D 41/10 |
| 2022/0153120 A1* | 5/2022 | Karlsson ................ B60K 6/24 |

OTHER PUBLICATIONS

International Search Report and Written Opinion issued by the International Searching Authority, dated Mar. 9, 2022, for International Patent Application No. PCT/US2021/058210; 12 pages.

* cited by examiner

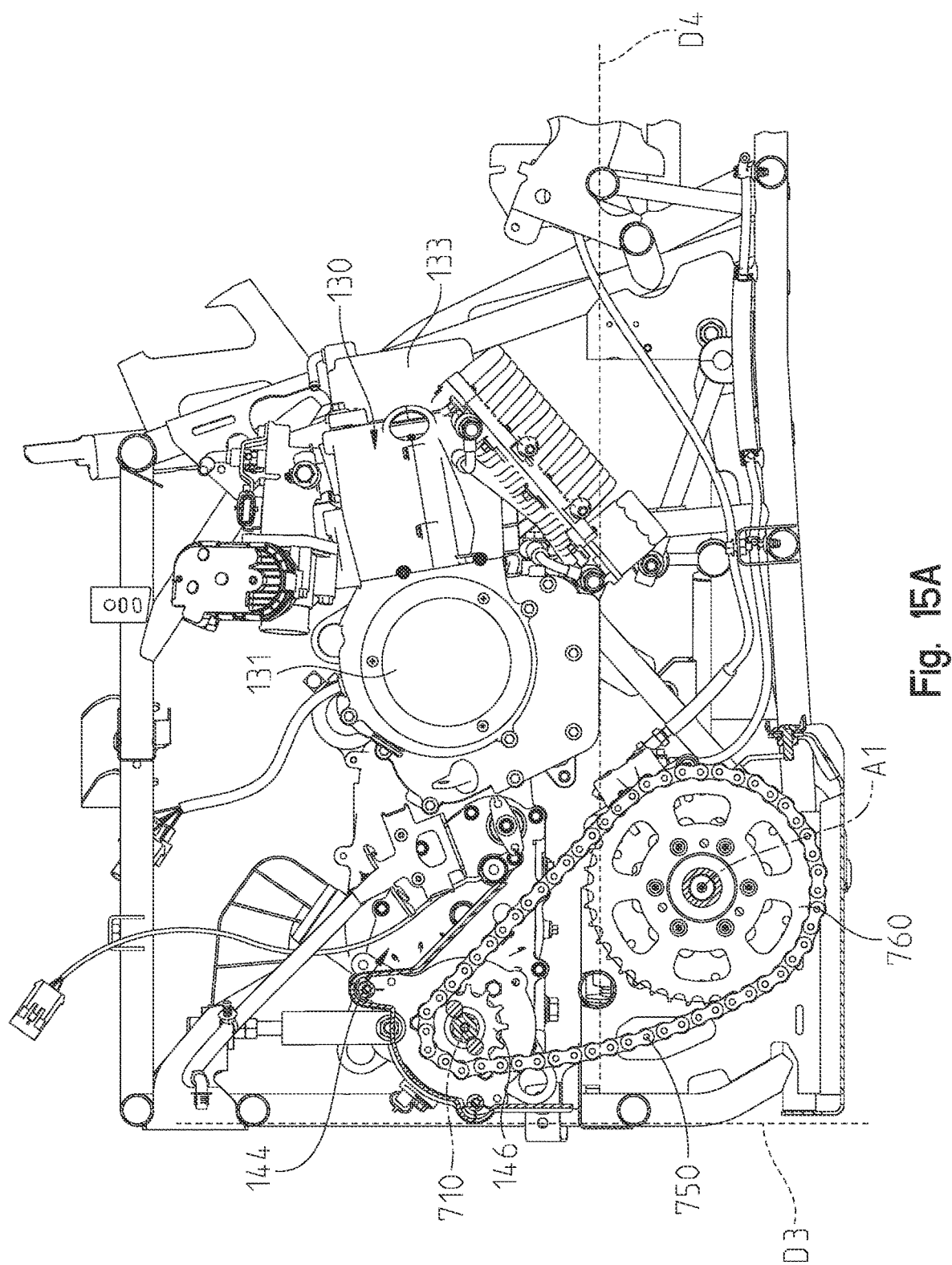

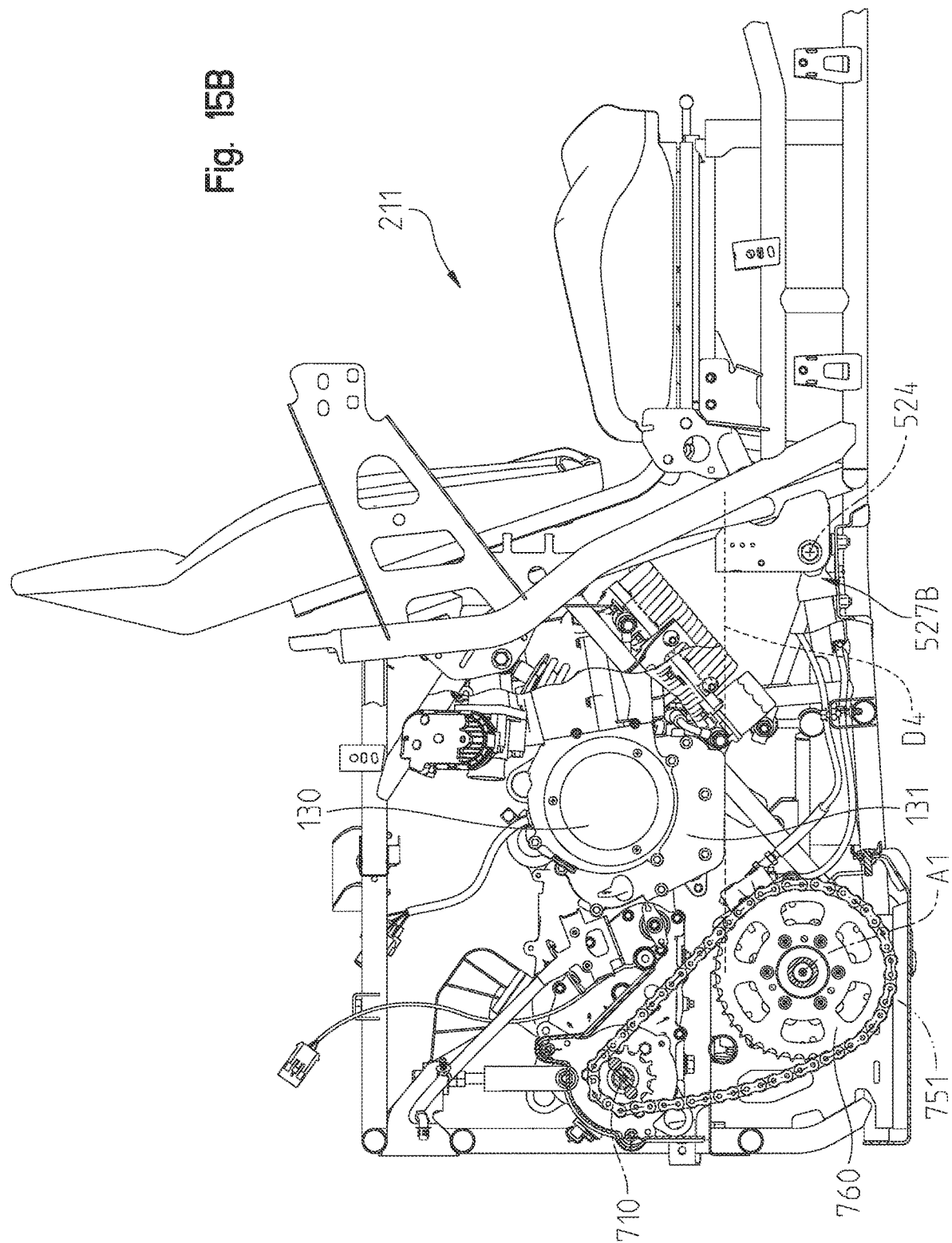

VEHICLE

CROSS-REFERENCE TO RELATED APPLICATION

The present application claims priority to U.S. Provisional Patent Application No. 63/110,190, filed Nov. 5, 2020, the entire disclosure of which is incorporated herein by reference.

FIELD

The present disclosure relates generally to a vehicle and, in particular, to a vehicle having a rear suspension system.

BACKGROUND AND SUMMARY

Vehicles with independent rear suspensions are known. The present disclosure relates to vehicles, including utility vehicles. The present disclosure relates to suspension systems for vehicles. The present disclosure relates to arrangements of suspension systems and powertrain systems for vehicles.

In an exemplary embodiment of the disclosure, a vehicle comprises a frame; a side-by-side seating supported by the frame; a plurality of ground engaging members supporting the frame, including a plurality of rear ground engaging members; a first rear suspension coupling a first ground engaging member of the plurality of ground engaging members to the frame and comprising a first trailing arm moveably coupled to the frame at a first location forward of a first rotational axis of the first ground engaging member and a first control arm moveably coupled to the frame at a second location rearward of the first rotational axis of the first ground engaging member; a second rear suspension coupling a second ground engaging member of the plurality of ground engaging members to the frame and comprising a second trailing arm moveably coupled to the frame at a third location forward of a second rotational axis of the second ground engaging member and a second control arm moveably coupled to the frame at a fourth location rearward of the second rotational axis of the second ground engaging member; and a power train supported by the frame, positioned rearward of the side-by-side seating, and operatively coupled to at least the first ground engaging member and the second ground engaging member of the plurality of ground engaging members through a rear driving member to propel the vehicle, wherein a rotation axis of the rear driving member is positioned completely below the power train.

In an example thereof, an output shaft from the power train is positioned vertically above and closer to a rear end of the vehicle relative to the rotation axis. In a further example thereof, wherein the rear driving member is a jackshaft coupled to an output shaft of the power train, wherein the output shaft is operatively coupled to the jackshaft to cause a rotation of the jackshaft and the jackshaft is operatively coupled to the rear ground engaging members to cause a rotation of the rear ground engaging members. In still a further example thereof, the vehicle further comprises a brake and a drive sprocket on the jackshaft each positioned within a lateral extent of a rear portion of the frame. In yet a further example thereof, the drive sprocket is coupled to the output shaft through a chain, and the power train is mounted within the frame such that a tension is maintained within the chain. In still a further example thereof the power train is approximately horizontal within the frame.

In yet still a further example thereof, the power train is mounted to the frame through an adjustable mount. In still a further example thereof, the first suspension further comprises a first radius rod coupled to at least one of the rear ground engaging members, and the second suspension further comprises a second radius rod coupled to at least one of the rear ground engaging members. In still a further example thereof, the first radius rod is coupled to the frame at a first mounting point, and the second radius rod is coupled to the frame at a second mounting point, the first and second mounting points being positioned forward of an output shaft of the power train. In yet still a further example thereof, the first and second mounting points are also positioned rearward of the rotation axis of the rear driving member. In still a further example thereof, the first and second trailing arms are coupled to the frame at a first position and a second position respectively, each of the first and second positions being forward of and below the power train.

In another exemplary embodiment of the disclosure, a vehicle comprises a frame; a side-by-side seating supported by the frame; a plurality of ground engaging members supporting the frame, including a plurality of rear ground engaging members; a power train supported by the frame, positioned rearward of the side-by-side seating, and operatively coupled to at least one of the plurality of ground engaging members to propel the vehicle; and a rear suspension comprising a trailing arm coupled to the frame and at least one of the rear ground engaging members, wherein the trailing arm is coupled to the frame at a position completely below of the power train.

In an example thereof, a first ground engaging member of the plurality of rear ground engaging members define a rotation axis, the rotation axis being positioned below the power train. In further example thereof, the power train comprises an output shaft positioned above and rearward of the rotation axis. In a still further example thereof, the vehicle further comprises a rear driving member operatively coupled to the plurality of rear ground engaging members, wherein the output shaft delivers a torque to the rear driving member. In yet another example thereof, the vehicle further comprises a brake and a sprocket positioned along the rear driving member and within a lateral extent of a rear portion of the frame, the sprocket delivering the torque to the rear driving member from the output shaft through a chain. In still another example thereof, the power source is positioned approximately horizontally, and is adjustably mounted to the frame.

In another exemplary embodiment of the disclosure, a vehicle comprises a frame; a side-by-side seating supported by the frame; a plurality of ground engaging members supporting the frame, including a plurality of rear ground engaging members; a rear independent suspension coupled to the frame and at least one of the rear ground engaging members; and a power train supported by the frame, positioned rearward of the side-by-side seating, and operatively coupled to at least one of the plurality of ground engaging members to propel the vehicle, wherein the power source supplies a torque from an output shaft to a rear driving member through a chain, and the power source is adjustably mounted to the frame to maintain a tension within the chain.

In an example thereof, the rear driving member is positioned below the power train. In a further example thereof, the trailing arm is coupled to the frame below and forward of the power train. In another example thereof, the rear independent suspension includes a first radius rod and a second radius rod, and wherein the rear driving member is coupled to a first ground engaging member of the plurality of rear ground engaging members through a half shaft, the half shaft aligned approximately parallel with the first radius rod and the second radius rod and positioned forward of the first radius rod and the second radius rod. In yet another example thereof, an adjustable power source mount is positioned on the frame above the power train. In still another example thereof, the rear independent suspension further includes a trailing arm coupled to the frame and the first ground engaging member of the plurality of rear ground engaging members.

In yet another exemplary embodiment of the disclosure, a vehicle comprises a frame; a side-by-side seating supported by the frame; a plurality of ground engaging members supporting the frame, including a plurality of rear ground engaging members; a rear suspension comprising a trailing arm coupled to the frame and at least one of the rear ground engaging members; and a power train supported by the frame, positioned rearward of the side-by-side seating, and operatively coupled to at least one of the plurality of ground engaging members to propel the vehicle, wherein a rotation axis of the rear ground engaging members is positioned completely below the power source when the vehicle is in a rest state.

In still yet another exemplary embodiment of the disclosure, a vehicle comprises a frame; a side-by-side seating supported by the frame; a plurality of ground engaging members supporting the frame, including a plurality of rear ground engaging members; a power train supported by the frame and operatively coupled to at least one of the plurality of ground engaging members through an output shaft; and a rear suspension comprising a trailing arm rotatably coupled to the frame at a first mounting position and to at least one of the ground engaging members, and a lateral arm extending between a first end and a second end, the first end rotatably coupled to the frame at a second mounting position and the second end supported by at least one of the ground engaging members, wherein the second mounting position is forward of the output shaft.

In an example thereof, the first mounting position is forward of the power train. In another example thereof, the output shaft is operatively coupled to at least one of the plurality of ground engaging members through a rear driving member, the rear driving member coupled to the output shaft through a drive chain. In a further example thereof, the second mounting position is within a perimeter of the drive chain when viewed from a side view in a direction perpendicular to a plane defined by the perimeter of the drive chain.

BRIEF DESCRIPTION OF THE DRAWINGS

FIG. 15A illustrates a first right side view of a powertrain and the rear suspension system of the vehicle of FIG. 1;
FIG. 15B illustrates a second right side view of a powertrain and the rear suspension system of the vehicle of FIG. 1.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a side-by-side youth vehicle, it should be understood that the features disclosed herein may have application to other types of vehicles such as all-terrain vehicles, motorcycles, watercraft, snowmobiles, and golf carts.

Figure 1:
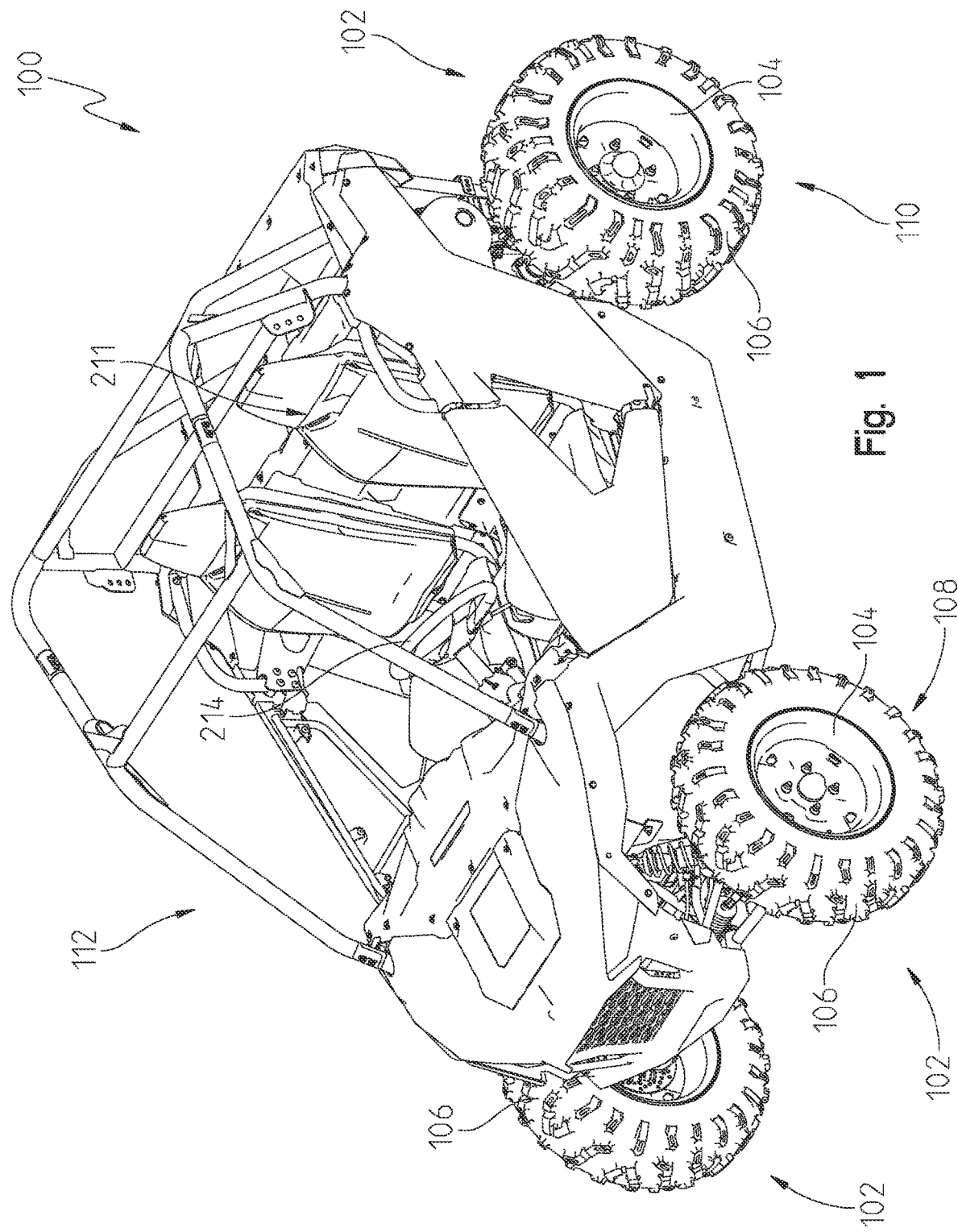
FIG. 1 is a front, perspective view of an exemplary vehicle.
Figure 2:
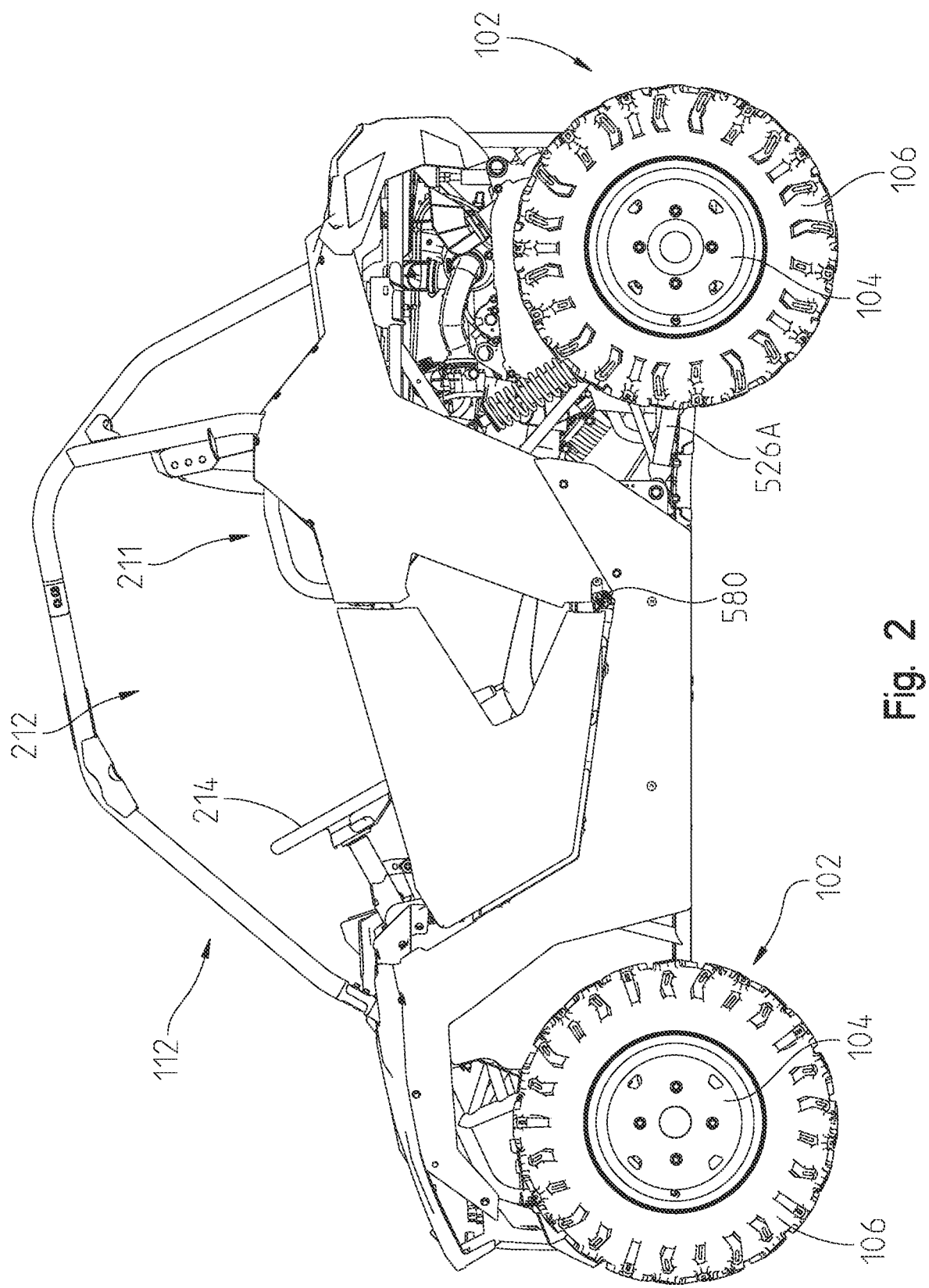
FIG. 2 illustrates a left side view of the exemplary vehicle of FIG. 1.
Figure 3:
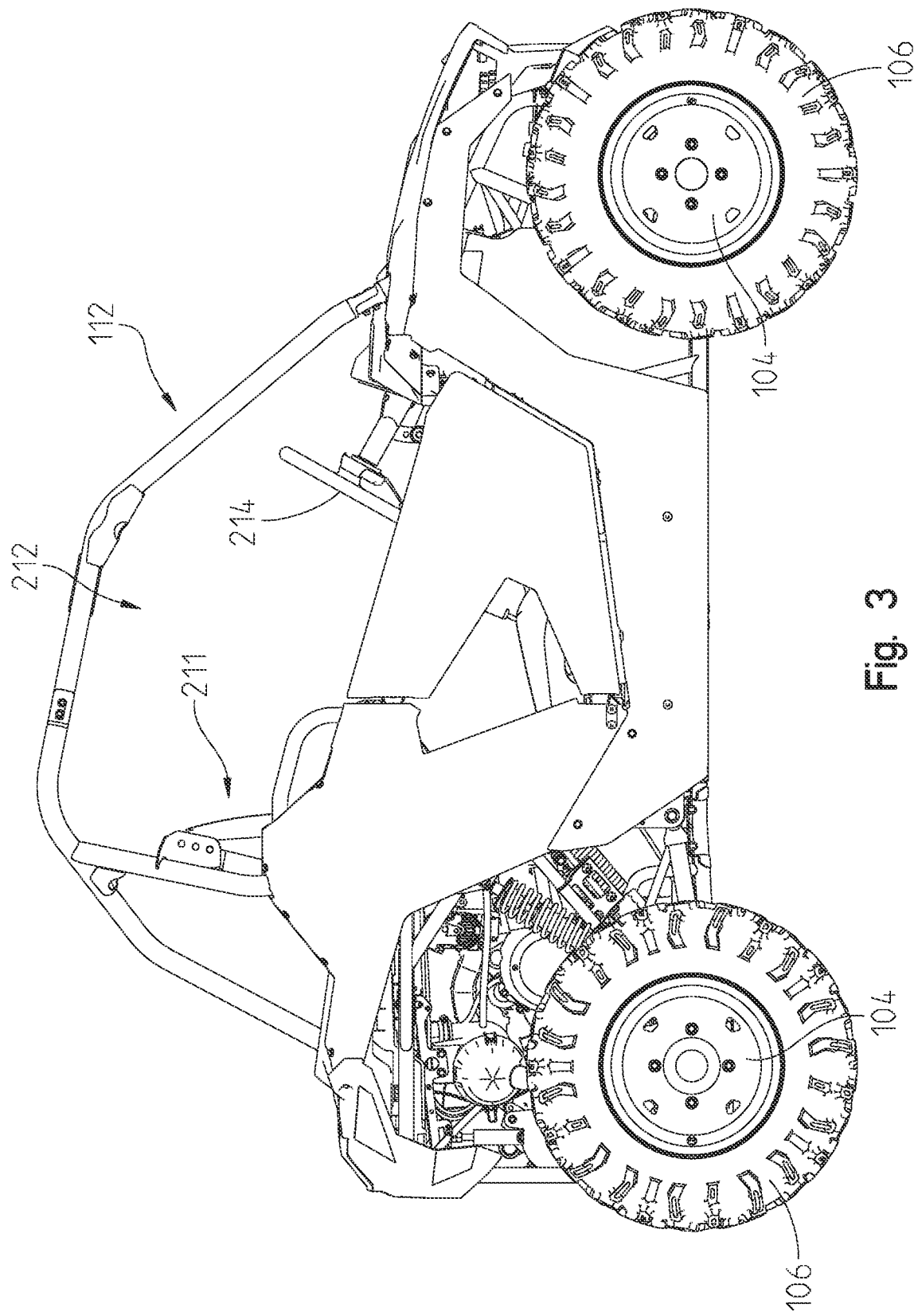
FIG. 3 illustrates a right side view of the exemplary vehicle of FIG. 1.

Referring to FIG. 1, an illustrative embodiment of a vehicle 100 is shown. Vehicle 100 as illustrated includes a plurality of ground engaging members 102. Illustratively, ground engaging members 102 are wheels 104 and associated tires 106. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

In embodiments, vehicle 100 is a youth side-by-side vehicle. Exemplary youth vehicles have a wheelbase in the range of about 60 inches to about 75 inches, an overall vehicle width in the range of about 44 inches to about 50 inches, and an unloaded overall vehicle ground clearance height in the range of about 9 inches to about 12 inches in a rest state. An exemplary youth vehicle has a wheelbase of about 65 inches, an overall vehicle width of about 50 inches, and an unloaded overall vehicle ground clearance height of about 9 inches.

As mentioned herein one or more of ground engaging members 102 are operatively coupled to a power source 130 (see FIG. 8) to power the movement of vehicle 100. Exemplary power sources include internal combustion engines and electric motors. In the illustrated embodiment, the power source 130 is an internal combustion engine.

Referring to the illustrated embodiment in FIG. 1, a first set of wheels, one on each side of vehicle 100, are provided. In embodiments wherein vehicle 100 includes an optional front drive 154 (see FIG. 8), the two front wheels are each independently coupled to the optional front drive and the rotational axis of each wheel may be referred to as a front axle 108 of vehicle 100. A second set of wheels, one on each side of vehicle 100 are also provided. In embodiments, each of the rear wheels are each independently coupled to a jack shaft and are generally referred to as rear axle 110 of the vehicle 100. Although each of front axle 108 and rear axle 110 are shown having a single ground engaging member 102 on each side, multiple ground engaging members 102 may be included on each side of the respective front axle 108 and rear axle 110.

Figure 5:
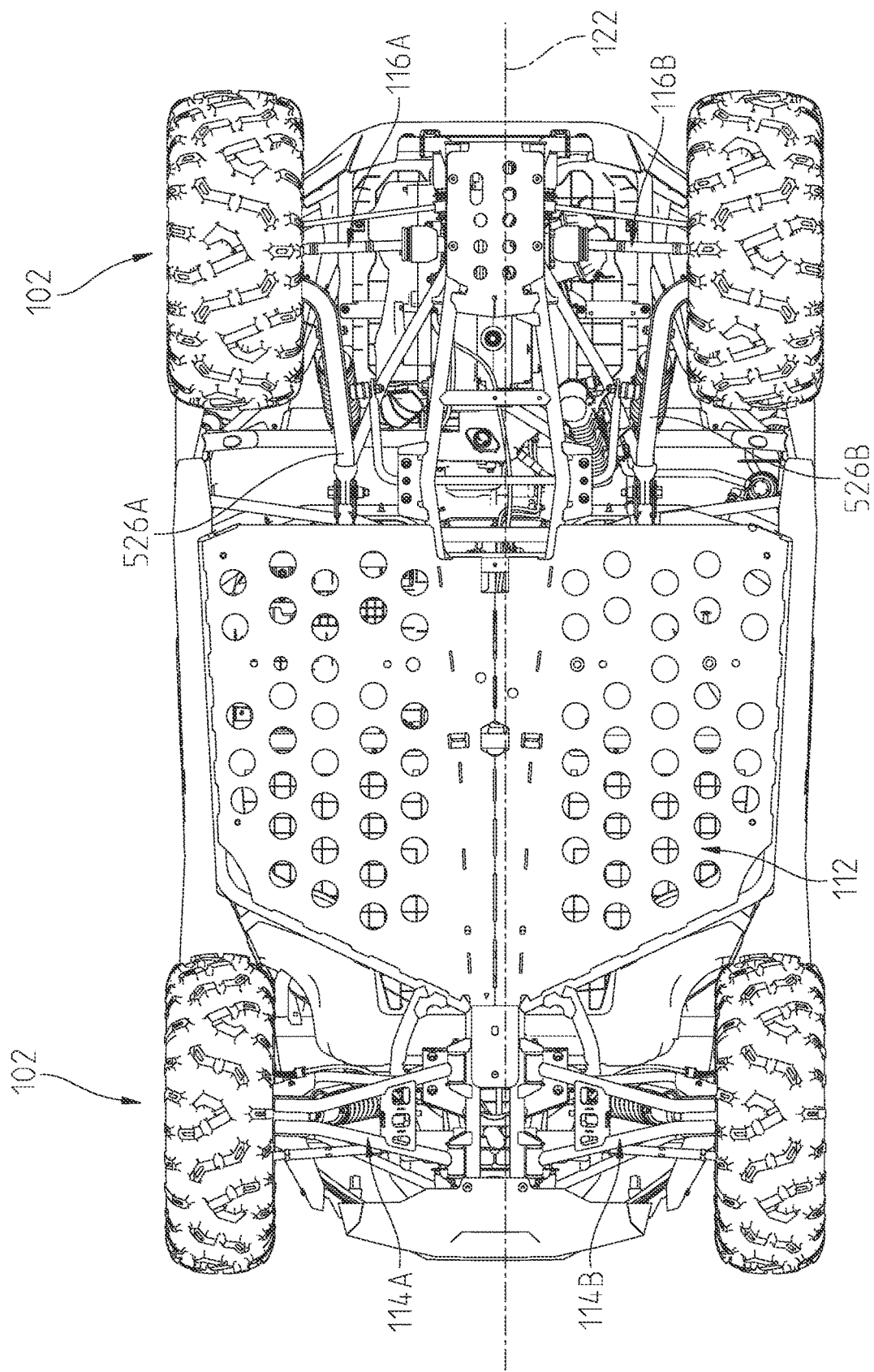
FIG. 5 illustrates a bottom view of the exemplary vehicle of FIG. 1.
Figure 6:
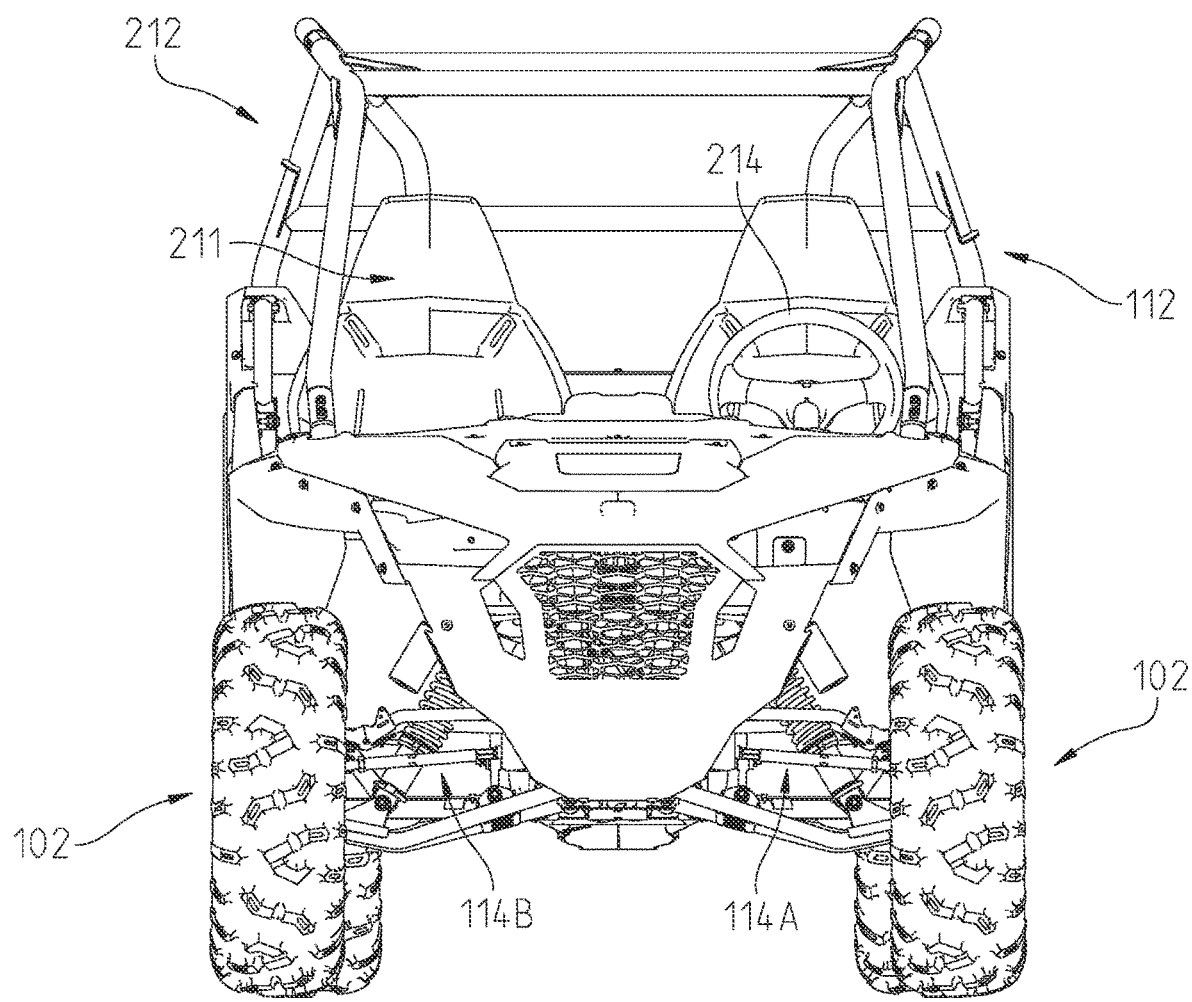
FIG. 6 is a front view of the exemplary vehicle of FIG. 1.
Figure 11:
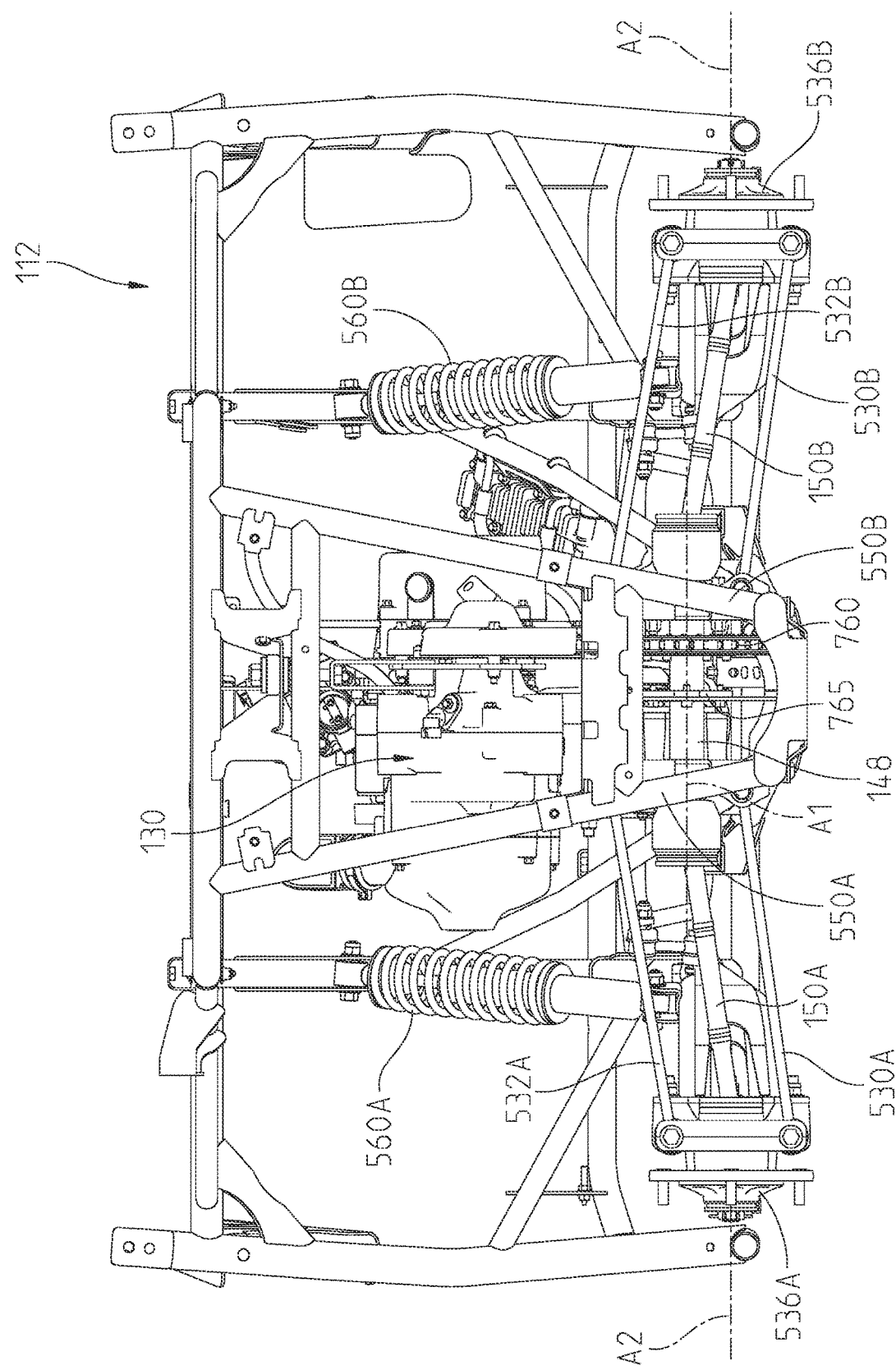
FIG. 11 illustrates a rear view of the rear suspension system of the vehicle of FIG. 1.

Referring to FIG. 5, the wheels 104 of front axle 108 are coupled to a frame 112 of vehicle 100 through front independent suspensions 114. Front independent suspensions 114 in the illustrated embodiment are double A-arm suspensions. Other types of suspensions systems may be used for front independent suspensions 114. The wheels 104 of rear axle 110 are couple to frame 112 of vehicle 100 through rear independent suspensions 116. Referring to FIG. 11, rear independent suspensions 116 in the illustrated embodiment include trailing arms 526 A, B and radius rods 530 A, B, 532 A, B (see FIG. 7). Herein, multiple components of vehicle 100 may be referenced as "A, B" which may indicate similar components on different sides of vehicle, such as a left and right side or a driver and passenger side. It should be understood that descriptions of elements with A, B indication may be applicable to both the A and B embodiments of the elements, and that where only one element A or B is shown or described, it should be understood that the other element is configured similarly. Other types of suspensions systems may be used for rear independent suspensions 116. In one embodiment, both front suspensions 114 and rear suspensions 116 provide about 7 inches of suspension travel. In another embodiment, both front suspensions 114 and rear suspensions 116 provide from about 5 inches to about 9 inches of suspension travel.

Figure 8:
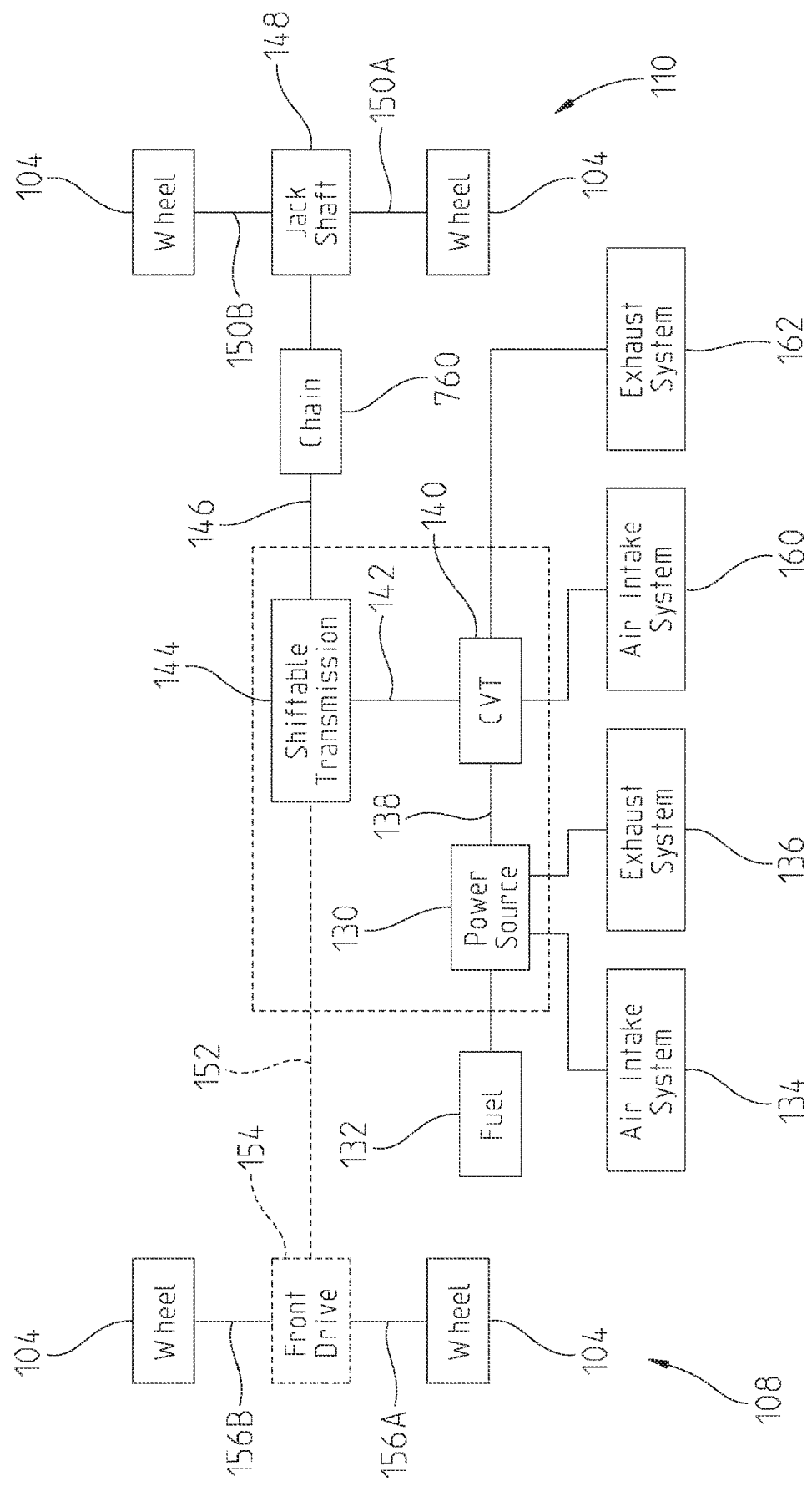
FIG. 8 illustrates a representative view of a drive system of the exemplary vehicle of FIG. 1
Figure 9:
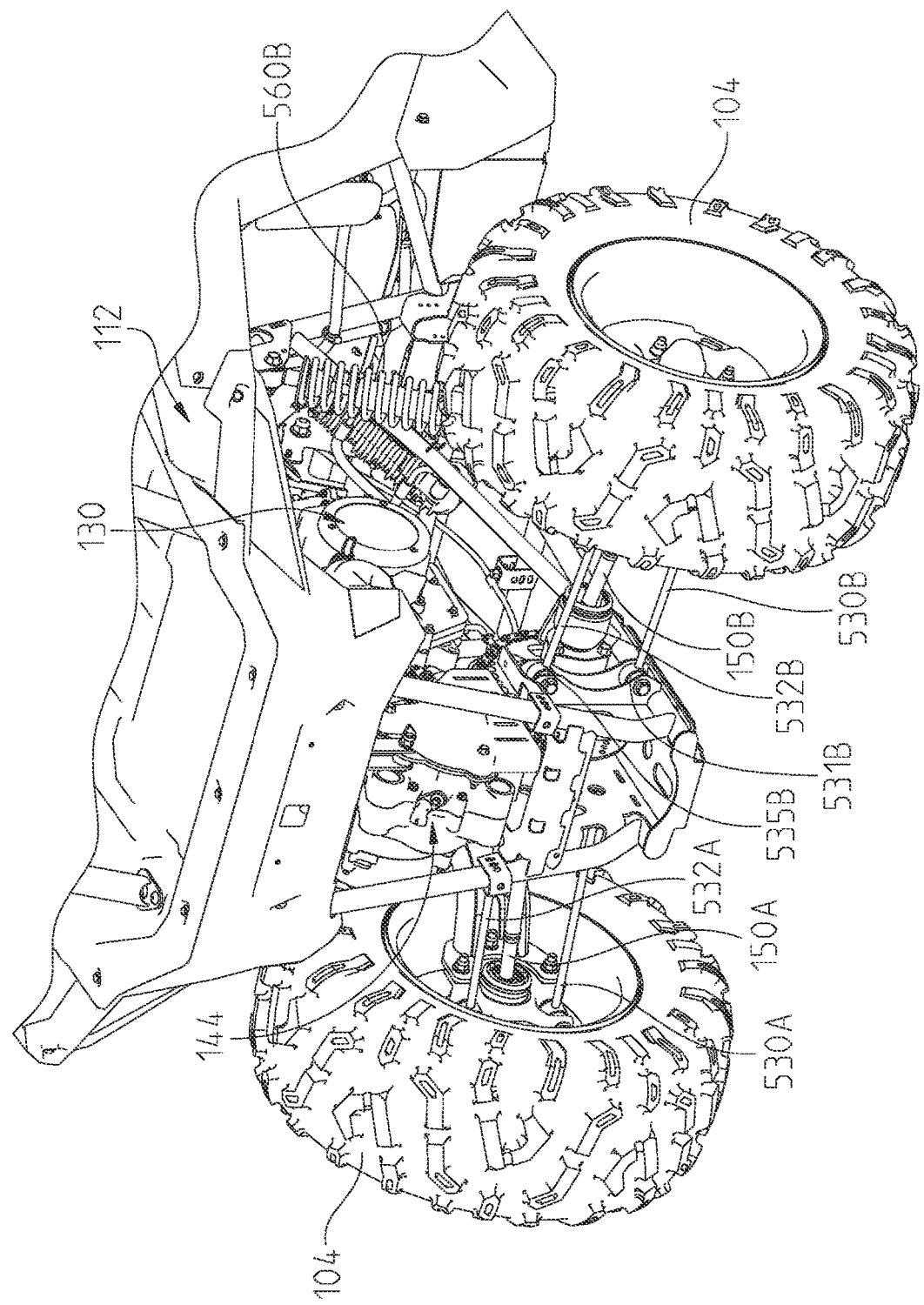
FIG. 9 illustrates a first perspective view of a rear suspension system of the vehicle of FIG. 1.
Figure 10:
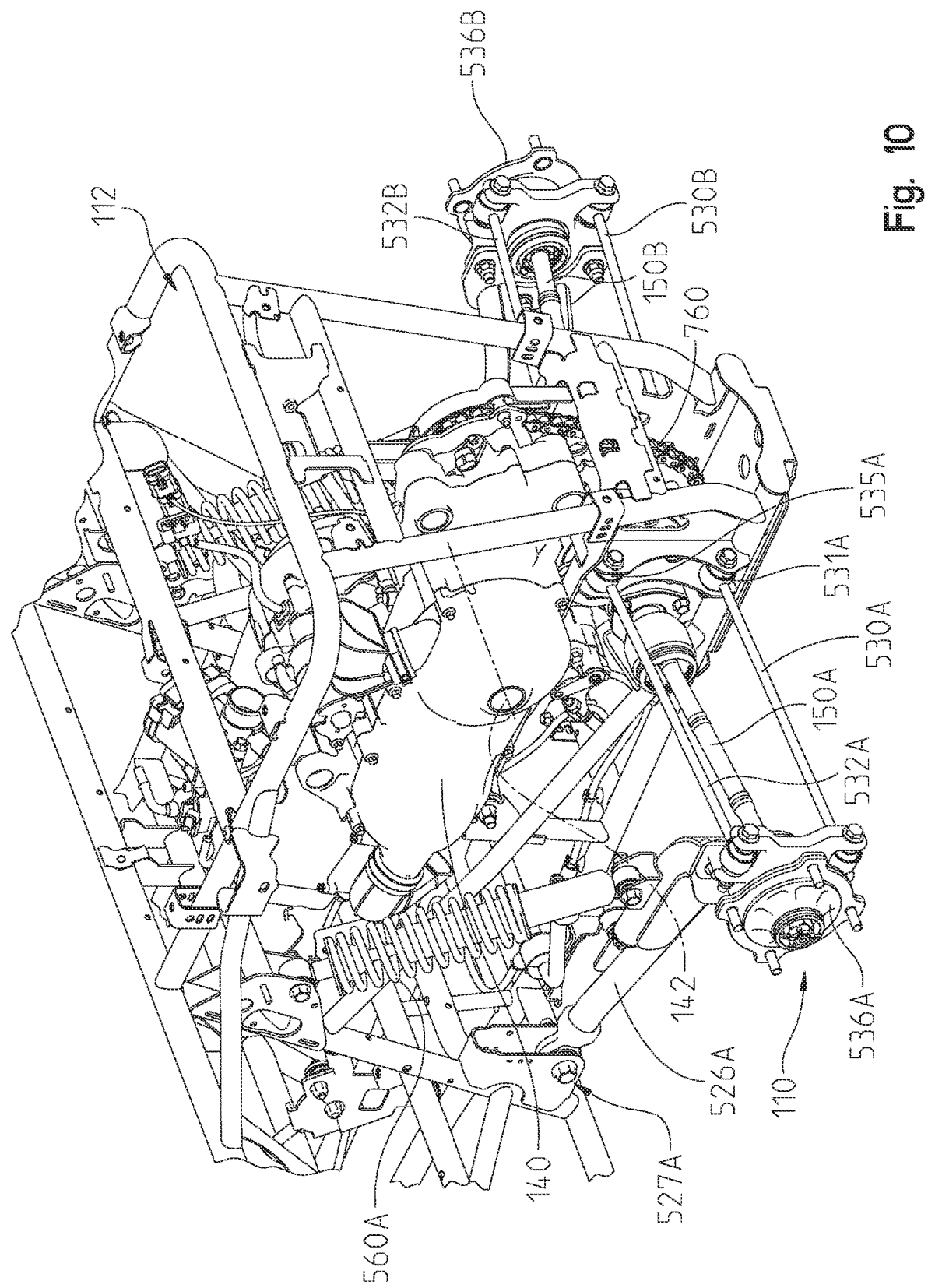
FIG. 10 illustrates a second perspective view of the rear suspension system of FIG. 9.

Referring to FIG. 8, an internal combustion power source 130 is represented. Power source 130 receives fuel from a fuel source 132 and ambient air from an air intake system 134. Exhaust is expelled from power source 130 through an exhaust system 136. In other embodiments, power source 130 may be an electric motor, in which case the power source 130 would not receive fuel but rather be coupled to a plurality of rechargeable batteries which may be supported by the frame 112. An output shaft 138 of power source 130 is coupled to a drive member of a CVT unit 140. A driven member of the CVT unit 140 is operatively coupled to the drive member of the CVT unit 140 through a drive belt. CVT unit 140 receives ambient air through an air intake system 160 and expels air from an interior of CVT unit 140 through an exhaust system 162. The driven member is coupled to an output shaft 142 which is operatively coupled to an input of a shiftable transmission 144. Together, power source 130, CVT unit 140, and shiftable transmission 144 define a power train. The power train generally provides a motive force and determines a direction of travel for vehicle 100.

A first output shaft 146 of shiftable transmission 144 is coupled to a rear drive unit or a rear drive member, in this case of the illustrated embodiment a jackshaft 148. Jackshaft 148 is coupled to output shaft 146 through a chain 760. Jackshaft 148 is coupled to corresponding wheels 104 through half shafts 150. The rear drive unit may be a differential. In embodiments, wherein the wheels 104 of optional front axle 108 are powered an optional second output shaft 152 of shiftable transmission 144 is coupled to an optional front drive unit 154. Optional front drive unit 154 is coupled to corresponding wheels 104 through optional half shafts 156. Optional front drive unit 154 may be a differential. In other embodiments, the vehicle 100 may be a rear wheel drive vehicle and may not comprise a front drive. The power train, jack shaft 148, half shafts 150 A, B, and optional front drive unit 154 and half shafts 156 comprise a drive train.

Figure 4:
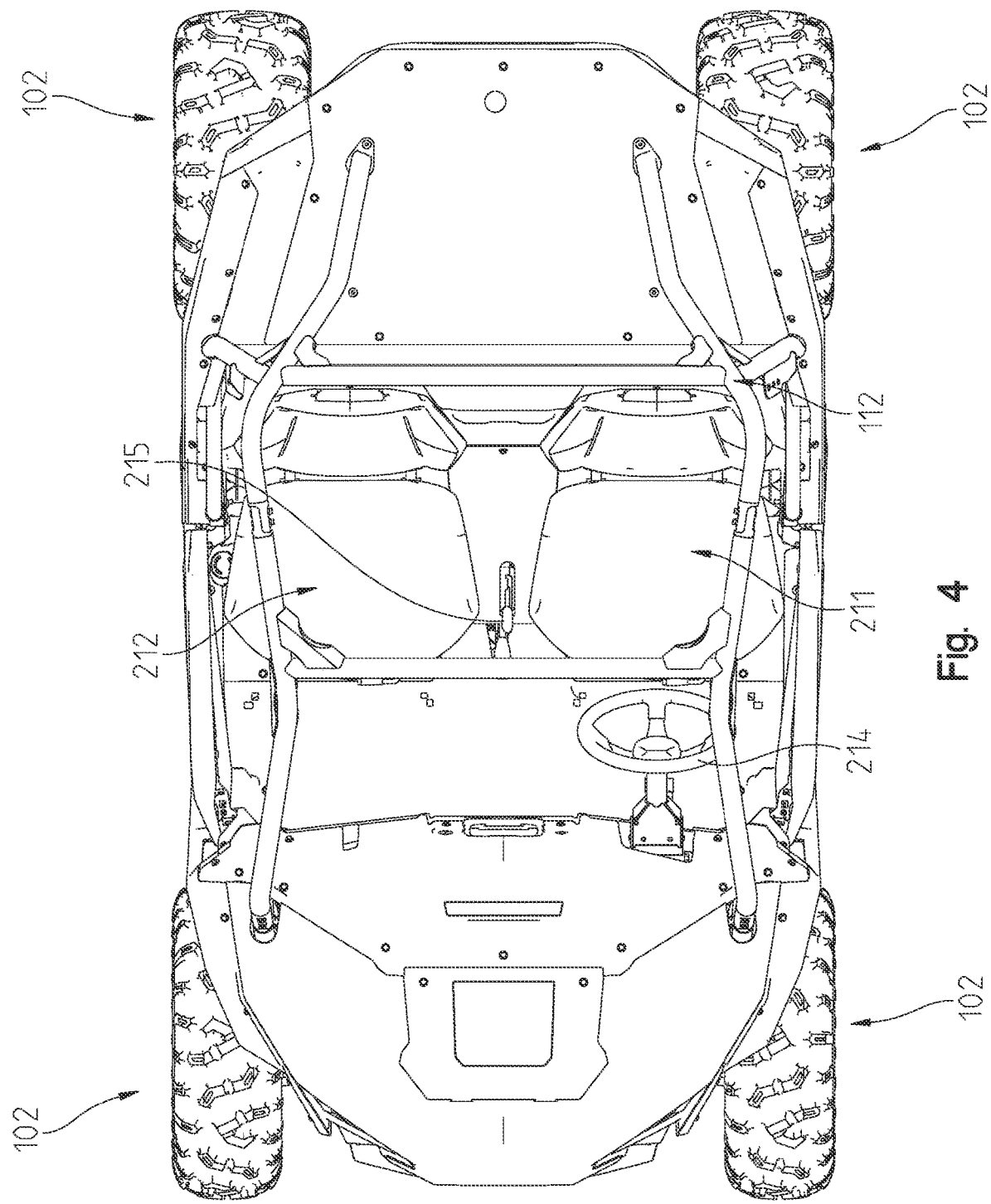
FIG. 4 illustrates a top view of the exemplary vehicle of FIG. 1.

Returning to FIG. 1, an operator area 212 includes seating 211 and a plurality of operator controls. In the illustrated embodiment, seating 211 includes a pair of bucket seats. In one embodiment, seating 211 is a bench seat. In one embodiment, seating 211 includes multiple rows of seats, either bucket seats or bench seats or a combination thereof. Exemplary operator controls include a steering wheel 214, a gear selector, an accelerator pedal, and a brake pedal. Steering wheel 214 is operatively coupled to the wheels of front axle 108 to control the orientation of the wheels relative to frame 112 and steer vehicle 100. Gear selector 215 (see FIG. 4) is operatively coupled to shiftable transmission 144 to select a gear of shiftable transmission 144. Exemplary gears include one or more forward gears, one or more reverse gears, and a park setting. An accelerator pedal (not shown) is operatively coupled to power source 130 to control the speed of vehicle 100. A brake pedal (not shown) is operatively coupled to brake units, such as brake 765 (see FIG. 14), associated with one or more of wheels 104 to slow the speed of vehicle 100.

Figure 13:
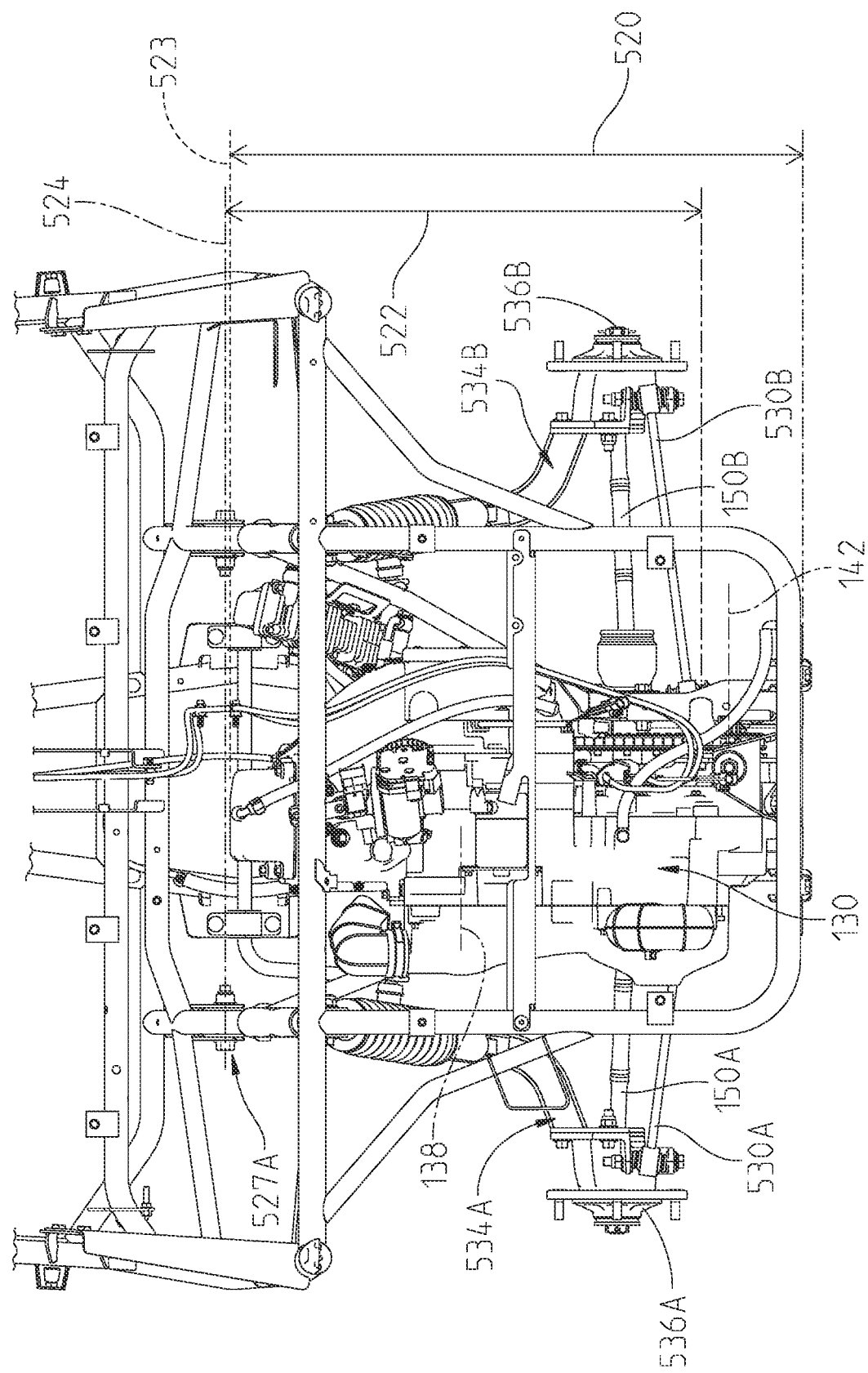
FIG. 13 illustrates a top view of the rear suspension system of the vehicle of FIG. 1.

Referring to FIG. 13, distance 520 represents the longitudinal extent of power source 130, shiftable transmission 144, and jack shaft 148. Line 523 passes along a forward extent of power source 130. Distance 522 represents the longitudinal extent of rear independent suspensions 116. Line 524 passes through the pivot axis of trailing arms 526 A, B of rear independent suspensions 116.

Further, in the illustrated embodiment the power source 130, shiftable transmission 144, and CVT unit 140 are positioned completely behind seating 211. In addition, in the illustrated embodiment, output shaft 138 of power source 130 and output shaft 142 of CVT unit 140 both are oriented along a lateral extent of vehicle 100. Further, the half shafts 150 extending from rear drive unit 148 are laterally extending. An advantage, among others, of this arrangement is it eliminates the need for any right angle drives between power source 130 and the wheels 104 of rear axle 110. This reduces the width of rear jackshaft 148 which permits the use of longer half shafts 150 which in turn permits greater suspension travel for rear suspensions 116.

Figure 19:
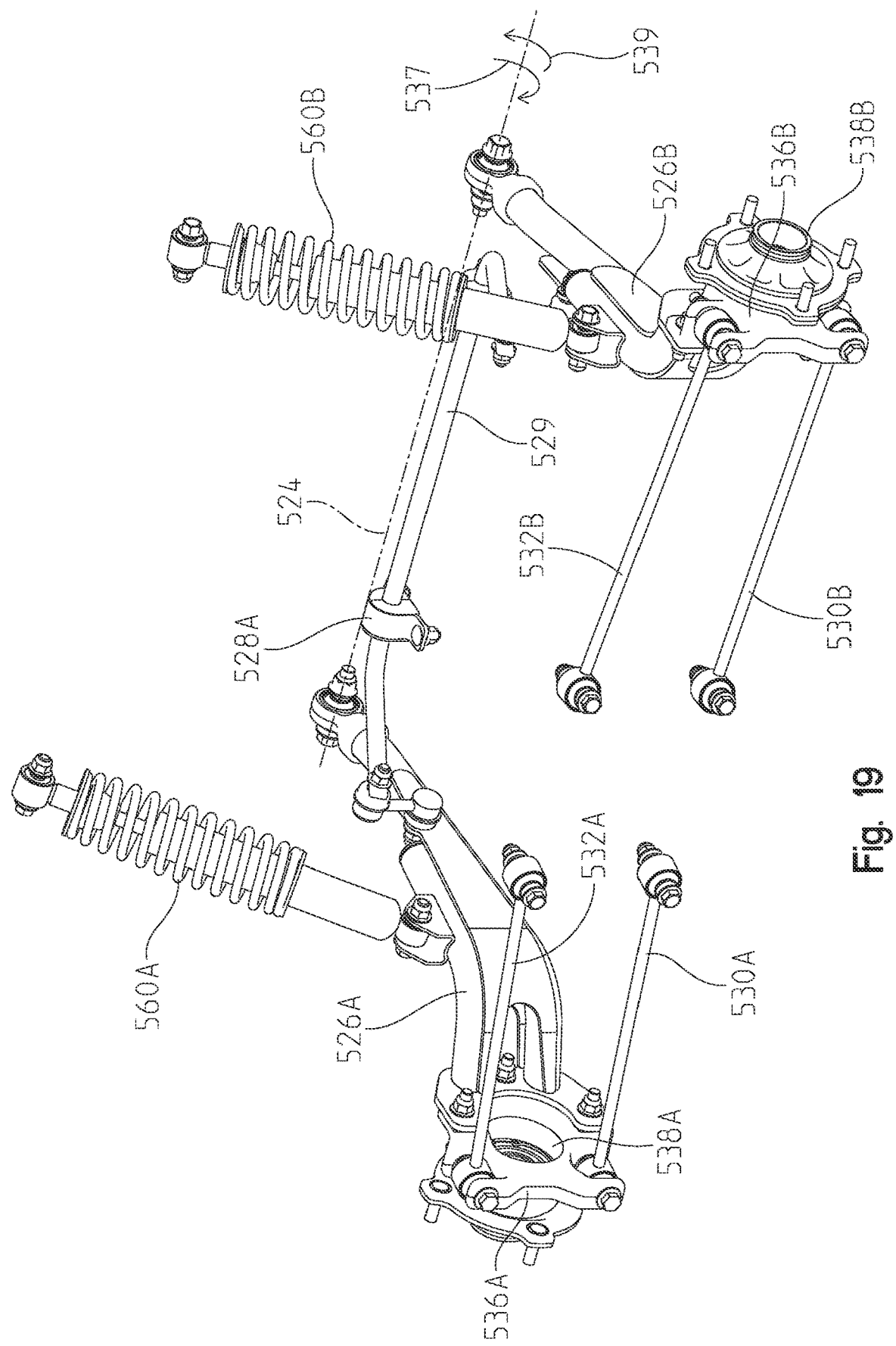
FIG. 19 is a perspective view of elements of the rear suspension system of the vehicle of FIG. 1 removed from the vehicle.
Figure 20:
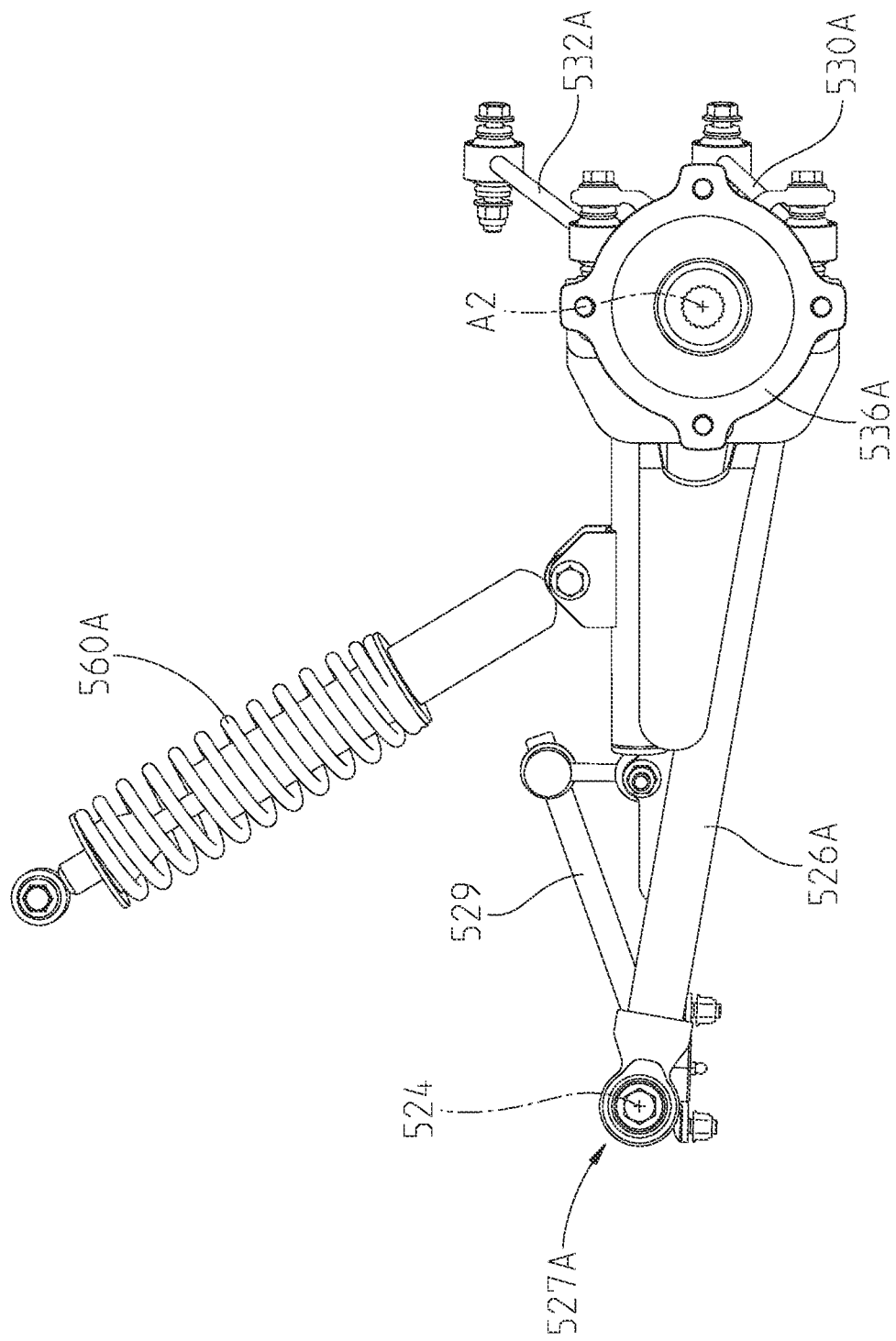
FIG. 20 is a side view of the elements of FIG. 19.

Referring to FIGS. 19-20, rear independent suspensions 116 include trailing arms 526 A and B, radius rods 530 A and B and radius rods 532 A and B. Trailing arms 526 A, B are rotatably coupled to frame 112 about line 524 in directions 537 and 539 through a trailing arm mounts 527 A, B (see FIG. 19). In one embodiment, trailing arms 526 A, B are coupled to frame 112 through spherical bearings. In the illustrated embodiments, trailing arm mount 527 A, B and line 524 are positioned behind seating 211 and forward of power source 130. In another embodiment, trailing arm mount 527 A, B may be positioned entirely below the powertrain and still behind seating 211. As best shown in FIG. 5, trailing arms 526 A, B generally angle outwards from vertical centerline plane 122. A rear portion 534 A, B of trailing arms 526 A, B is coupled to a wheel carrier 536

A, B. In the illustrated embodiment, a portion of wheel carrier 536 A, B is fixed relative to trailing arms 526 A, B. Wheel carrier 536 A, B includes an opening 538 A, B through which one of half shafts 150 A, B is coupled to wheels 104. Half shafts 150 A, B are rotatably coupled to supporting members 550 A, B through a first pivot 551 A, B, and are rotatably coupled to wheel carriers 536 A, B through a second pivot 552 A, B. Radius rods 530 A, B and 532 A, B extend from a first end coupled to wheel carriers 536 A, B to a second end coupled to frame 112 at radius rod mounts 531 A, B and 535 A, B respectively.

As shown best in FIG. 15B, the trailing arms 526 A, B are coupled to the frame 112 at a position forward of and below the powertrain and rearward of seating 211. The lower extent of the power source 130, illustratively the bottom of a crankcase 131 is shown with line D4, and the trailing arm mount 527 A, B and line 524 are positioned on the frame 112 below line D4. As shown, trailing arm mount 527 A, B is also positioned forward of the powertrain. In other embodiments, trailing arm mount 527 A, B may be positioned completely below seating 211 or completely below the powertrain. Further, power source 130 is tipped forward such that a cylinder portion of power source 130 is directed towards seating 211.

Referring still to FIGS. 19-20, the suspensions 116 further comprise a stabilizer bar 529 rotatably coupled to a forward portion of the trailing arms 526 A, B. Stabilizer bar 529 comprises pivots 528 A, B which are positioned vertically below and rearward of trailing arm mounts 527 A, B, but above frame 112. Additionally, suspensions 116 further comprise dampening members 560 A, B. An upper end of a dampening member 560 A, B is rotatably coupled to trailing arms 526 A, B and to an upper portion of frame 112. A lower end of dampening member 560 A, B is rotatably coupled to trailing arms 526 A, B and to frame 112. In the illustrated embodiment, dampening member 560 is a shock. Dampening member 560 A, B is angled forward by having the connection point of dampening member 560 A, B to frame 112 being forward of the connection point of dampening member 560 A, B to trailing arms 526 A, B.

Wheel carrier 536 A, B is also coupled to one of radius rods 530 A, B and one of radius rods 532 A, B. In the illustrated embodiment, radius rods 530 A, B and radius rods 532 A, B are rotatably coupled to wheel carrier 536 A, B. Referring to FIG. 11, radius rods 530 A, B and radius rods 532 A, B are further rotatably coupled to support members 550 A,B of frame 112 which is coupled to rear frame member 480 of frame 112. As illustrated in FIG. 11, radius rods 530 A, B and radius rods 532 A, B are coupled to a rear portion of frame 112. By configuring rear independent suspensions 116 such that radius rods 530 A, B and radius rods 532 A, B may be coupled to the rear portion of frame 112, an overall length of frame 112 may be reduced.

Figure 7:
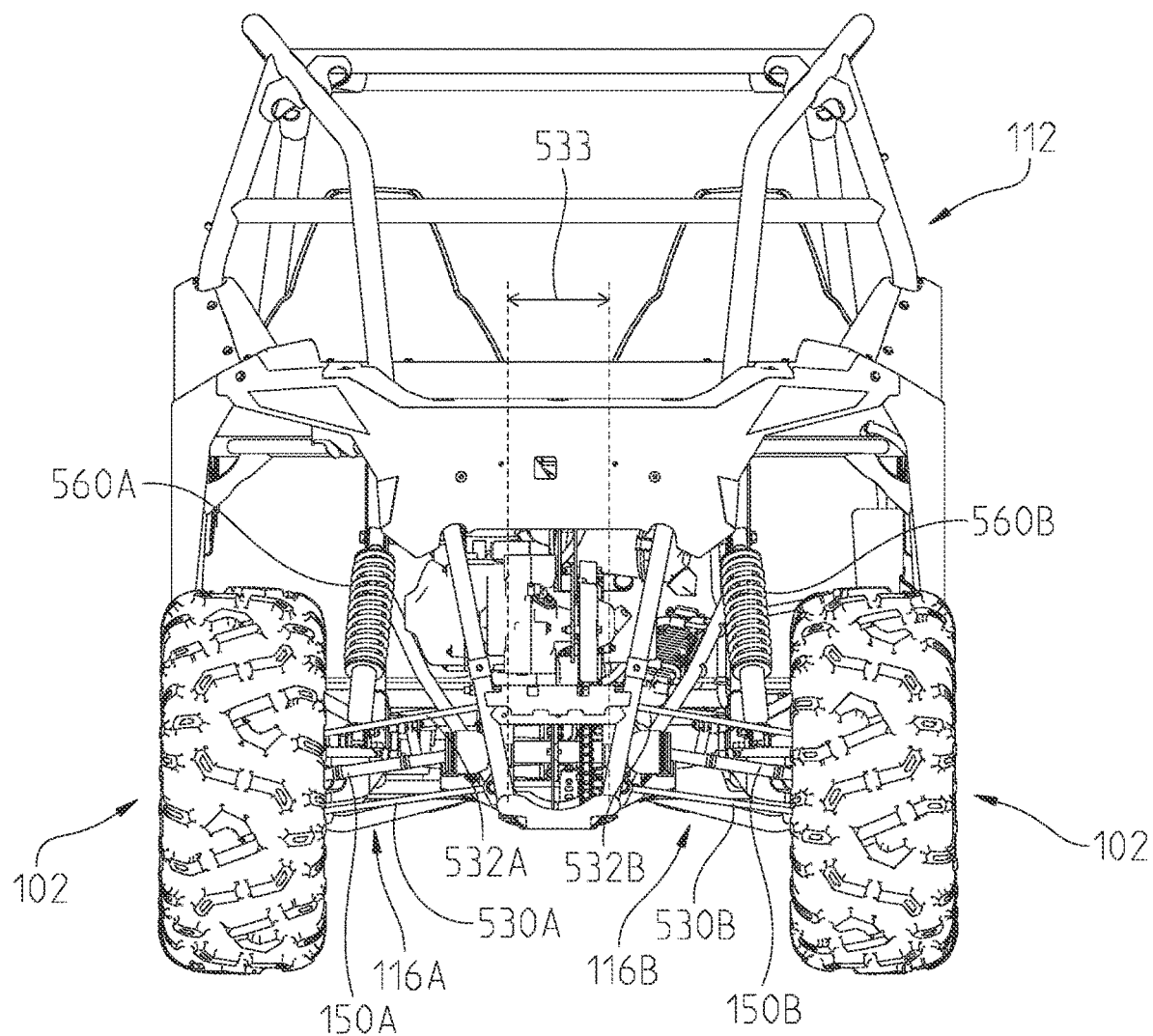
FIG. 7 is a rear view of the exemplary vehicle of FIG. 1.

Further, referring to FIG. 7, by configuring rear independent suspensions 116 such that radius rods 530 A, B and radius rods 532 A, B may be coupled to the rear portion of frame 112, the respective pivot axes of radius rods 530 A, B and radius rods 532 A, B relative to frame 112 may be positioned laterally within an envelope 533 of rear drive unit 148 (See FIG. 7).

Figure 12:
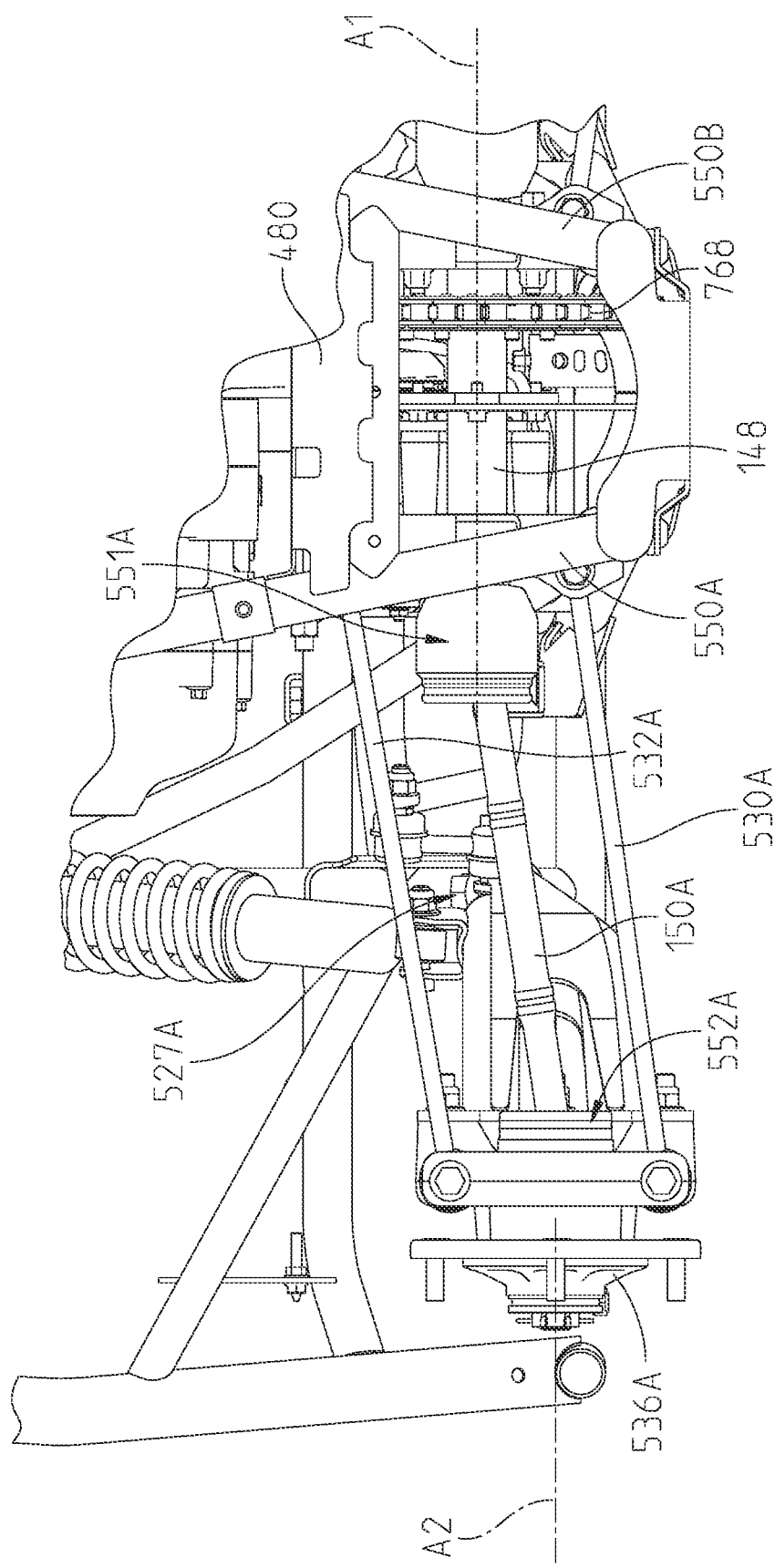
FIG. 12 illustrates a partial, rear view of the rear suspension system of the vehicle of FIG. 1.
Figure 14:
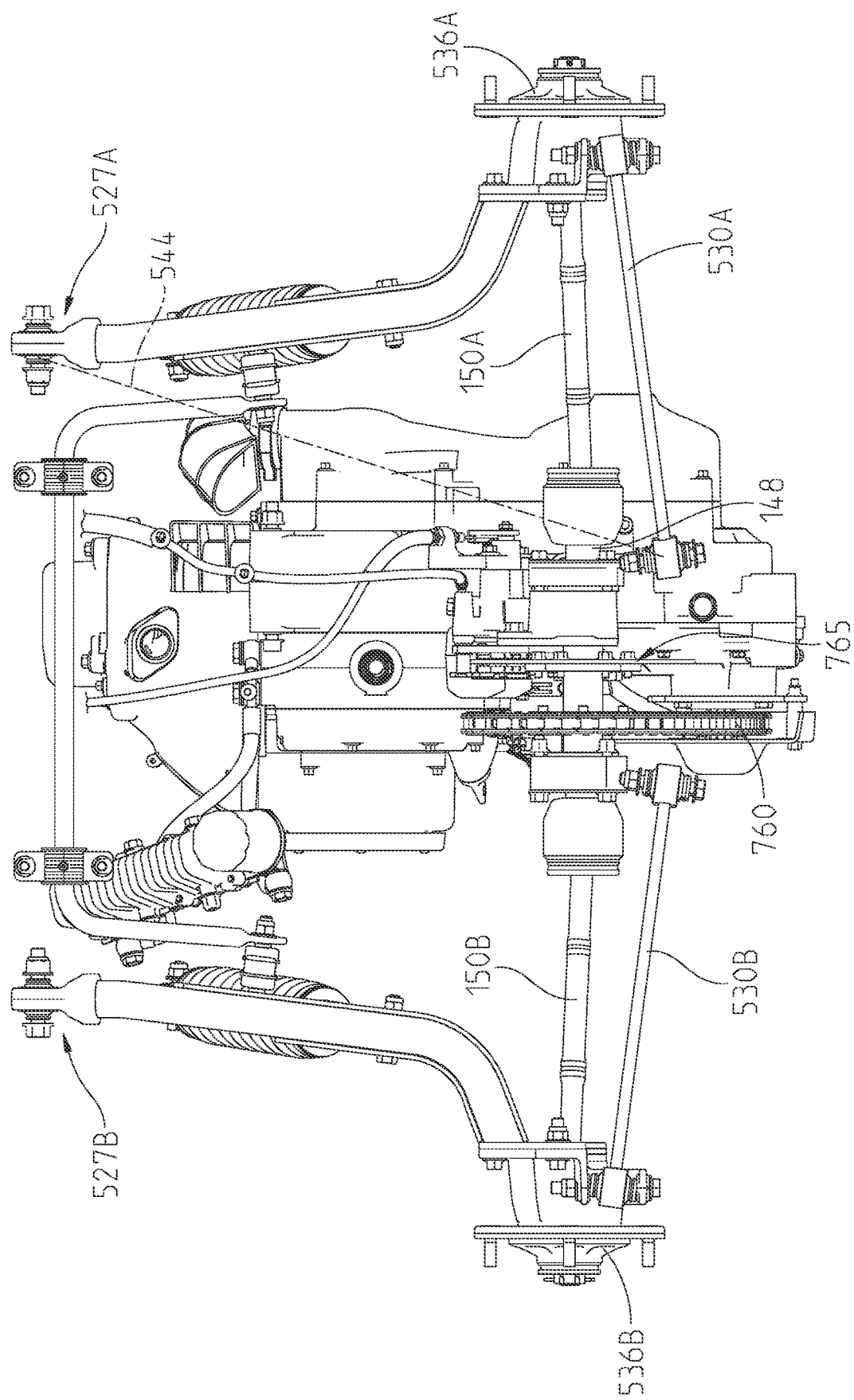
FIG. 14 illustrates a bottom view of the rear suspension system of the vehicle of FIG. 1.

As shown in FIG. 12, when suspensions 116 are viewed from the rear and the vehicle is in a rest state, trailing arm mount 527 A, B is positioned at approximately the midpoint of half shaft 150 A, B and radius rods 530 A, B and 532 A, B. In the rest state, vehicle 100 is generally not moving and is unloaded, for example when parked on a generally flat surface without any cargo or rider on board. Half shafts 150 A, B are also positioned generally parallel to and vertically equidistant between radius rods 530 A, B and 532 A, B. Additionally, trailing arm mount 527 A, B is positioned vertically below first pivot 551 A, B and jack shaft 148, and above second pivot 552 A, B. Referring to FIG. 14, first pivot 551 A, B is positioned outward of a line 544 extending from trailing arm mount 527 A, B to the radius rod mounts on supporting members 550 A, B. Additionally, in a top or bottom view as shown in FIGS. 13 and 14, half shafts 150 A, B are not parallel to radius rods 530 A, B and 532 A, B.

In one embodiment, vehicle 100 includes a network operatively connecting various components together. In one embodiment, the network is a CAN network. Exemplary CAN networks and vehicle components are disclosed in US Published Patent Application No. US20100090797, titled VEHICLE SECURITY SYSTEM, U.S. patent application Ser. No. 12/816,004, titled ELECTRIC VEHICLE, and U.S. patent application Ser. No. 11/218,163, titled CONTROLLER AREA NETWORK BASED SELF-CONFIGURING VEHICLE MANAGEMENT SYSTEM AND METHOD, the disclosures of which are expressly incorporated by reference.

Figure 16:
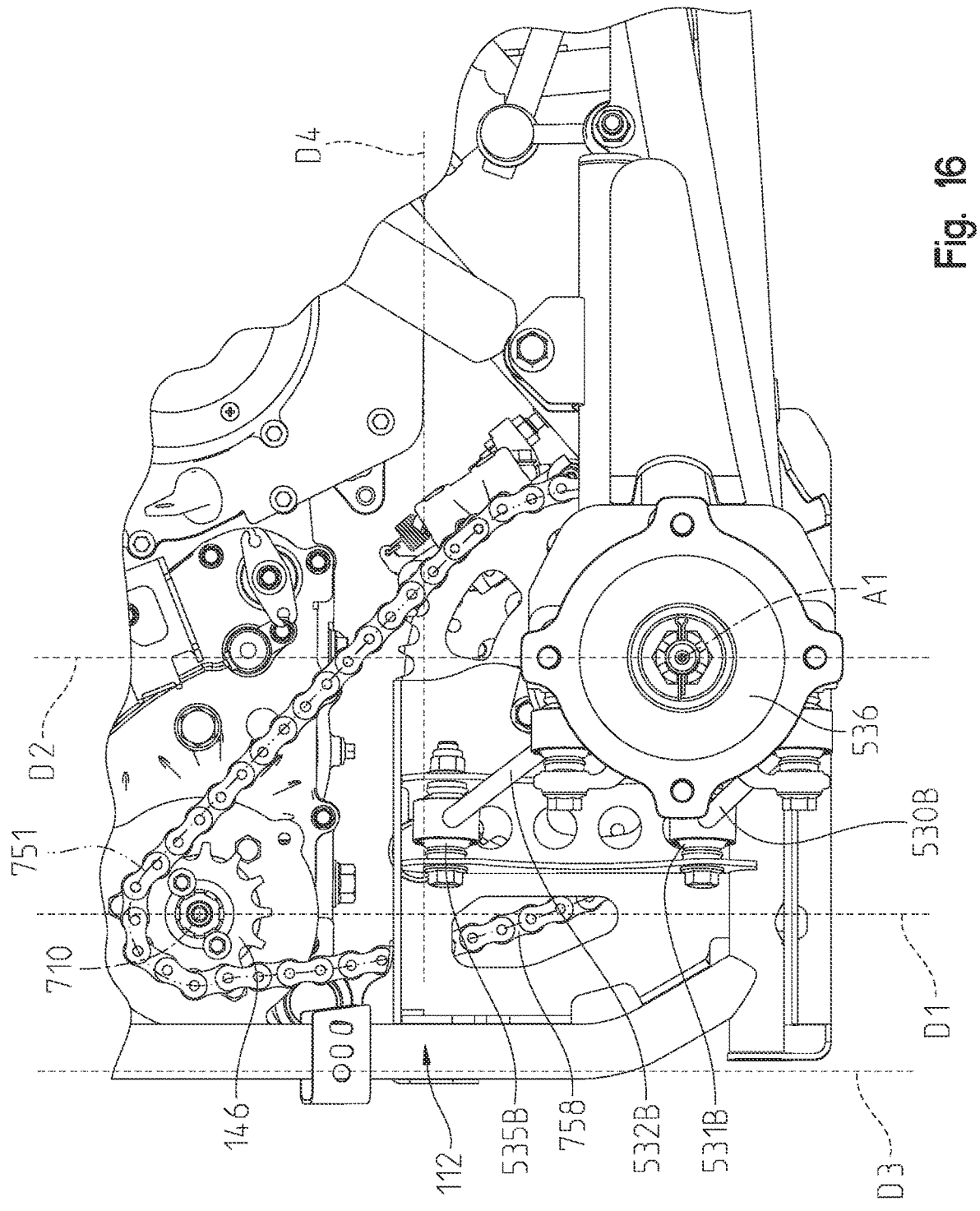
FIG. 16 is a partial right side view of the rear suspension of the vehicle of FIG. 1.
Figure 17:
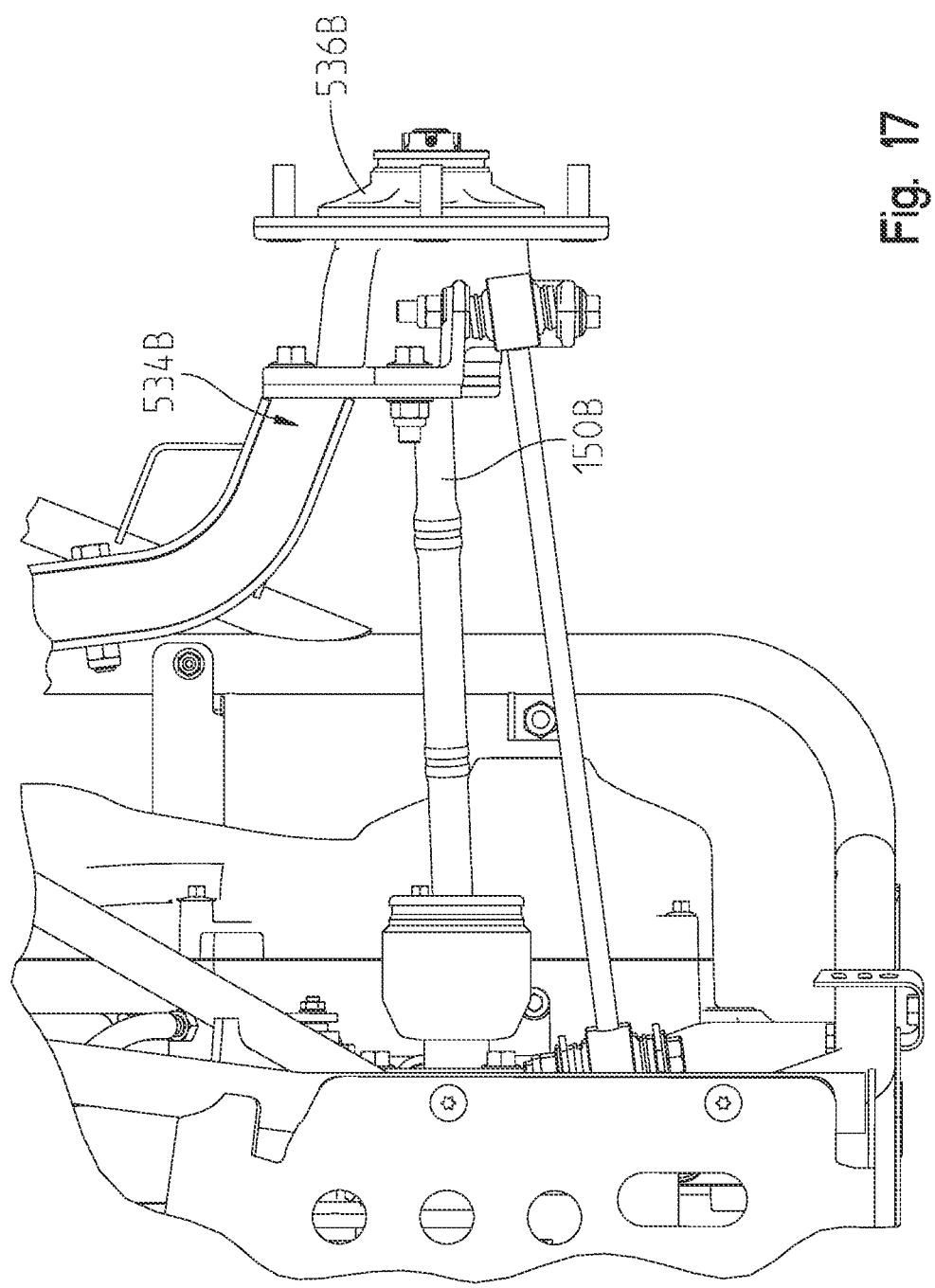
FIG. 17 is a partial rear view of the rear suspension system of the vehicle of FIG. 1.
Figure 18:
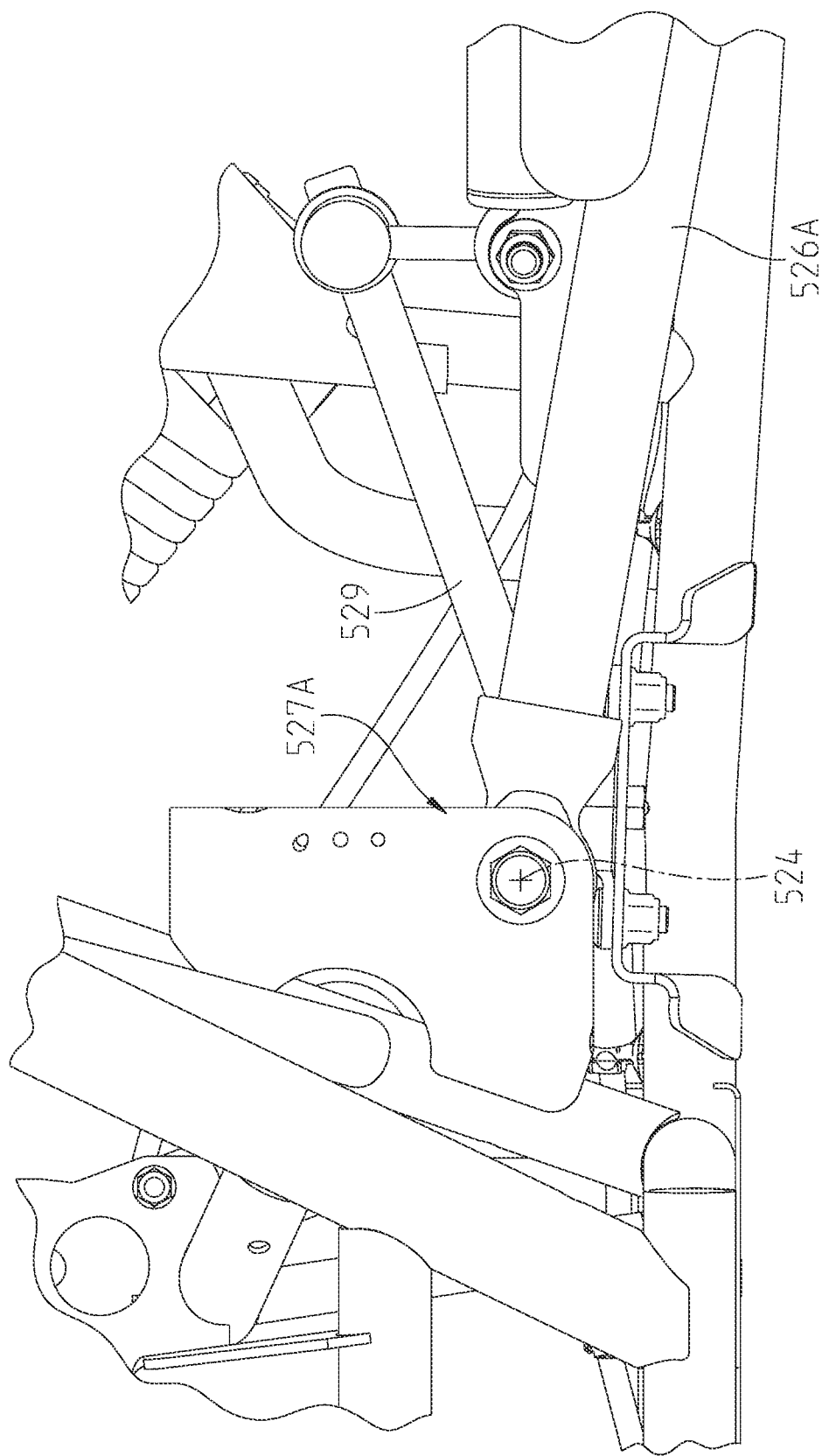
FIG. 18 is another partial, rear view of the rear suspension system of the vehicle of FIG. 1.

Referring to FIGS. 15A-16, the output shaft 142 from the shiftable transmission 144 is positioned vertically within the frame along line D1. The output shaft 146 rotates along an axis 710 (see FIG. 22), which may be described as a rotation axis of the output shaft 146, or a transmission output axis. The output shaft 146 is coupled to a drive chain 750, which in turn is coupled to a drive sprocket 760. The drive sprocket 760 is coupled to the jackshaft 148 (see FIG. 14), which is positioned along a rear axis A1 between the two rear wheels 104. Axis A1 may be described herein as a rear drive axis, a jackshaft axis, or a rotation axis of the rear drive member. Additionally, an axis A2 is formed along a center point of one of ground engaging members 102. (See FIG. 11), and may be described as a rotation axis of the rear ground engaging members. Axis A2 may correspond to either one of rear wheels 104, both of rear wheels 104 if they are aligned with one another, or any of ground engaging members 102. Since rear wheels 104 are configured to move independently of one another, axis A2 may not pass through both rear wheels 104 at any given position. Output shaft 146 delivers a torque to the jackshaft, which in turn delivers a torque to half shafts 150 A, B and then ground engaging members 102 to propel the vehicle.

The jackshaft 148 is positioned vertically within the frame 112 along vertical line D2. As illustrated in FIG. 16, the jackshaft, and accordingly axis A1, are positioned below and forward of the output shaft 146. Additionally, the rotational axis A1 of jackshaft 148 is positioned completely below the power source 130. The rearward extent of the power train, illustratively the rearward extent of shiftable transmission 144, is at vertical line D3, and the vertical extent of power source 130 is at line D4. Jackshaft 148 is positioned completely below the line D4 and completely forward of D3. The jackshaft 148 is also positioned forward and below of output shaft 146 of shiftable transmission 144. As shown, the jackshaft 148 and axis A1 are both in front of D1 and below axis 710. Positioning the jackshaft below the powertrain and in front of and below the output shaft 146 allows for the overall length of the vehicle 100 to be reduced.

Axis A2 is movable as the ground engaging members 102 move within suspension 116 throughout a movement of the vehicle 100. When the vehicle is in an airborne state, the suspension 116 is fully extended, and the ground engaging members 102 are at their lowest point, and are approximately horizontally aligned with one another. In this position, the axis A2 is also positioned fully below the power source 130, as well as the output shaft 146. Additionally, when the vehicle is at rest on the ground in a rest state, the axis A2 is also fully below the powertrain.

As best shown in FIGS. 15B and 16, drive chain 750 generally forms a perimeter 751 defined by the shape and extent of drive chain 750. Perimeter 751 generally defines an approximately planar shape, that shape defining a plane in which drive chain 750 generally lies. When viewed from a side view perpendicular to the plane defined by perimeter 751, radius rods 532 A, B are mounted to frame 112 through radius rod mounts 535 A, B at a position within the perimeter defined by drive chain 750. Additionally, radius rods 530 A, B and 532 A, B are mounted to frame 112 through radius rod mounts 531 A, B and 532 A, B at positions forward of output shaft 146 and line D1 and rearward of axis A1 and line D2.

Additionally, a brake 765 is positioned on the jackshaft 148 proximate the drive sprocket 760. Brake 765 may be activated by the brake pedal to slow the vehicle 100. Both brake 765 and drive sprocket 760 are positioned within the frame 112 of the vehicle. Specifically, as shown in FIG. 11, brake 765 and drive sprocket 760 are positioned within the vertical space between upstanding rear support members 550 A, B and are generally centrally located along jackshaft 148. Positioning brake 765 and drive sprocket 760 centrally along jackshaft 148 and within frame 112 allows for the width of the rear suspension 116 to be reduced.

Figure 21:
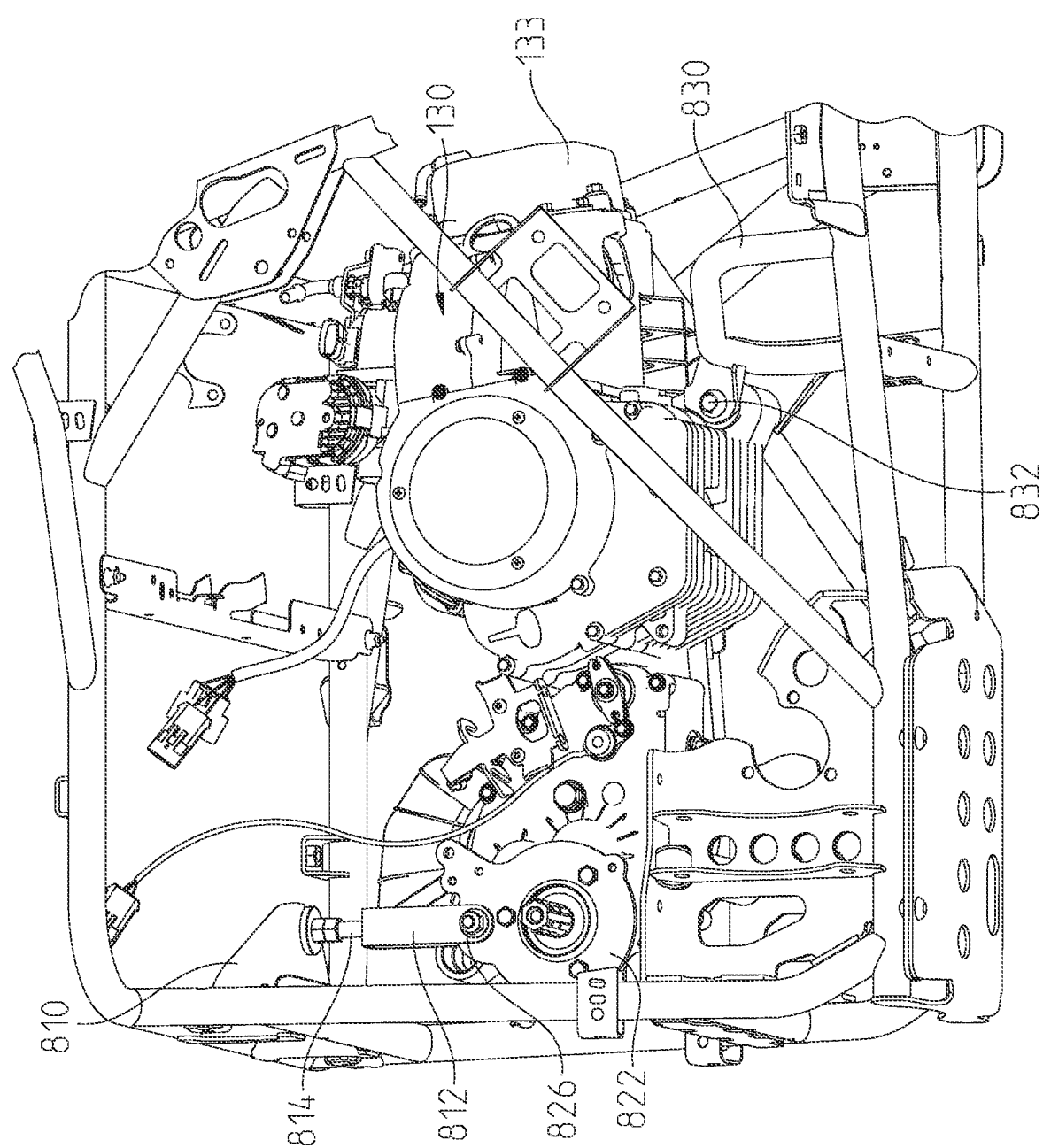
FIG. 21 is a perspective view of the powertrain of the vehicle of FIG. 1 mounted to a frame of the vehicle of FIG. 1.
Figure 22:
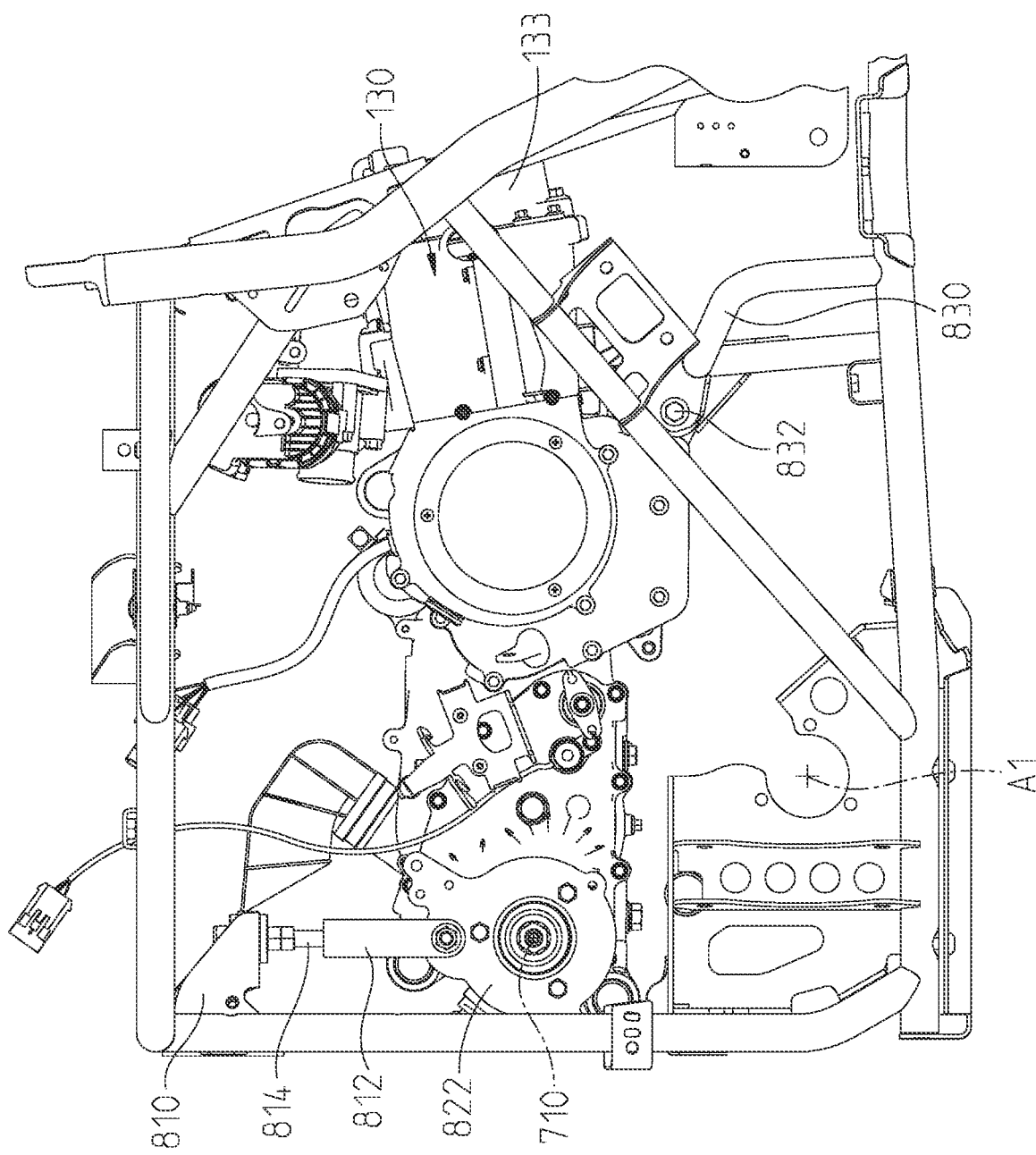
FIG. 22 is a side view of the powertrain of FIG. 21.
Figure 23:
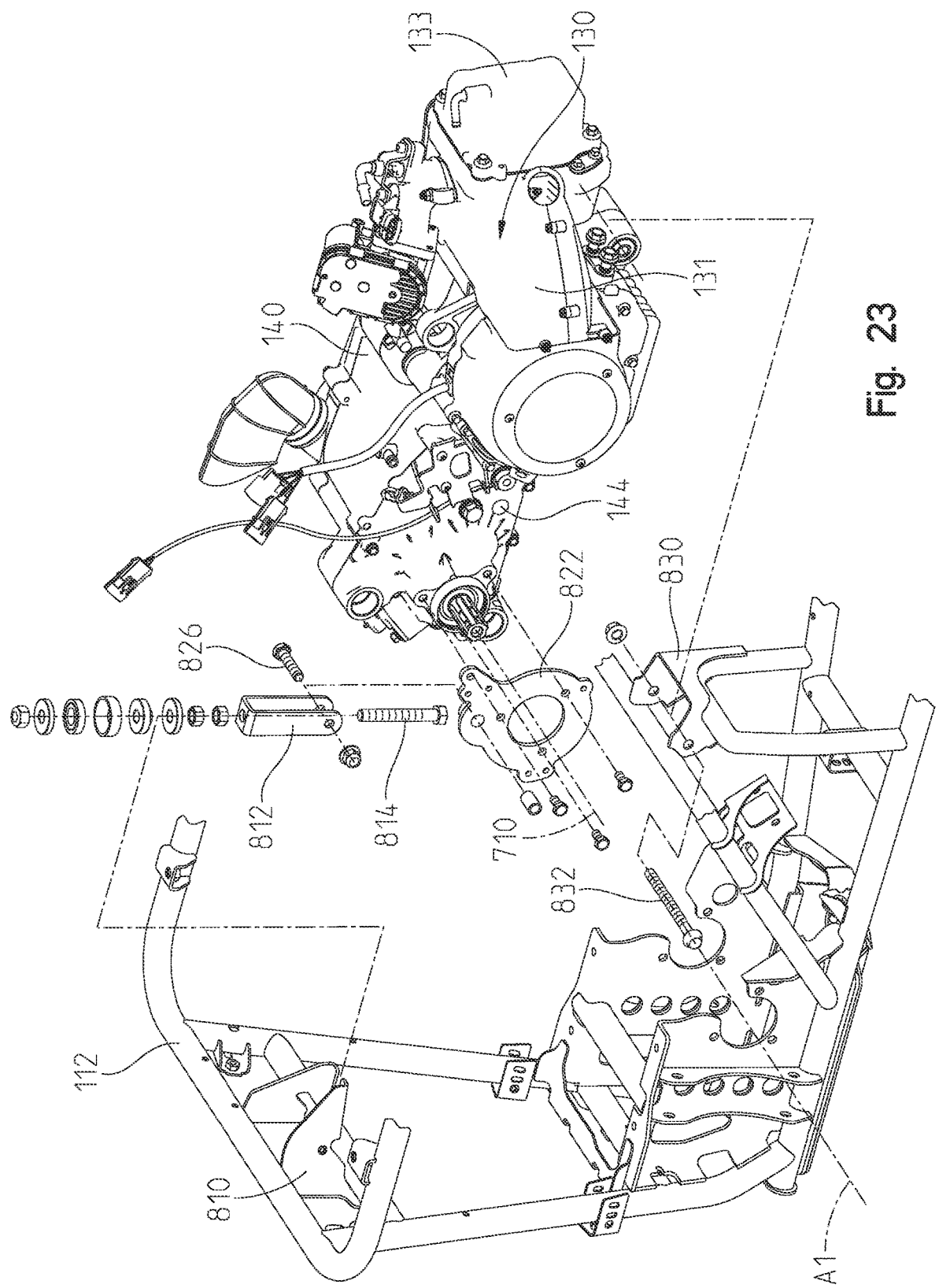
FIG. 23 is an exploded view of the powertrain of FIG. 21.

Referring to FIGS. 21-23, the powertrain is mounted within the frame 112 at multiple points. Power source 130 includes a crankcase 131 and a cylinder portion 133. Power source 130 is aligned generally horizontal within frame 112, as cylinder portion 133 is positioned closest to the seats 211, and forward of most of the other components of power source 130. A lower rear portion of the power source 130 is coupled to the frame 112 through a lower mount 830. The power source 130 couples to the lower mount 830 through a lower fastener 832 and a portion of the housing 131 configured to interact with the lower fastener 832.

A rearward, upper portion of the power source 130 is mounted to the frame 112 through an upper mount 810. The power source 130 attaches to upper mount 810 through an upper vertical bracket 812, an upper plate 822, a vertical fastener 814, and a horizontal fastener 826. The upper vertical bracket 812 couples to upper mount 810 through vertical fastener 814. Upper vertical bracket 812 additionally couples to upper plate 822 through horizontal fastener 826. Upper plate 822 is positioned around the output shaft 146 and its rotation axis 710. In the illustrated embodiment, upper vertical bracket 812 and vertical fastener 814 are vertically adjustable relative to the frame 112. Upper vertical bracket 812 and/or vertical fastener 814 may be adjusted to alter a rear height or an overall angle of the power source 130. In this way, upper vertical bracket 812 and vertical fastener 814 may be adjusted to alter a tension within drive chain 750. For example, the upper vertical bracket 812 and vertical fastener 814 may be adjusted to raise a rear portion of the power source 130, as well as the output shaft 146, and increase a tension within the chain 750. The upper vertical bracket 812 and vertical fastener 814 may also be adjusted to lower a rear portion of power source 130 to reduce tension within drive chain 750, which may allow for easier removal or replacement of drive chain 750.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle comprising:
   a frame;
   a side-by-side seating supported by the frame;
   a plurality of ground engaging members supporting the frame, including a plurality of rear ground engaging members;
   a first rear suspension coupling a first ground engaging member of the plurality of ground engaging members to the frame and comprising a first trailing arm moveably coupled to the frame at a first location forward of a first rotational axis of the first ground engaging member and a first control arm moveably coupled to the frame at a second location rearward of the first rotational axis of the first ground engaging member;
   a second rear suspension coupling a second ground engaging member of the plurality of ground engaging members to the frame and comprising a second trailing arm moveably coupled to the frame at a third location forward of a second rotational axis of the second ground engaging member and a second control arm moveably coupled to the frame at a fourth location rearward of the second rotational axis of the second ground engaging member; and
   a power train supported by the frame, positioned rearward of the side-by-side seating, and operatively coupled to at least the first ground engaging member and the second ground engaging member of the plurality of ground engaging members through a rear driving member, and a pair of half shafts coupled between the rear driving member and the first ground engaging member and the second ground engaging member, the rear driving member being positioned intermediate the pair of half shafts, wherein a rotation axis of the rear driving member is positioned completely below the power train.

2. The vehicle of claim 1, wherein an output shaft from the power train is positioned vertically above and closer to a rear end of the vehicle relative to the rotation axis.

3. The vehicle of claim 1, wherein the rear driving member is a jackshaft coupled to an output shaft of the power train, wherein the output shaft is operatively coupled to the jackshaft to cause a rotation of the jackshaft and the jackshaft is operatively coupled to the rear ground engaging members to cause a rotation of the rear ground engaging members.

4. The vehicle of claim 3, further comprising a brake and a drive sprocket on the jackshaft each positioned within a lateral extent of a rear portion of the frame.

5. The vehicle of claim 4, wherein the drive sprocket is coupled to the output shaft through a chain, and the power train is mounted within the frame such that a tension is maintained within the chain.

6. The vehicle of claim 5, wherein the power train is approximately horizontal within the frame.

7. The vehicle of claim 5, wherein the power train is mounted to the frame through an adjustable mount.

8. The vehicle of claim 1, the first suspension further comprising a first radius rod coupled to at least one of the rear ground engaging members, and the second suspension further comprising a second radius rod coupled to at least one of the rear ground engaging members.

9. The vehicle of claim 8, wherein the first radius rod is coupled to the frame at a first mounting point, and the second radius rod is coupled to the frame at a second mounting point, the first and second mounting points being positioned forward of an output shaft of the power train.

10. The vehicle of claim 9, wherein the first and second mounting points are also positioned rearward of the rotation axis of the rear driving member.

11. The vehicle of claim 1, wherein the first and second trailing arms are coupled to the frame at a first position and a second position respectively, each of the first and second positions being forward of and below the power train.

12. A vehicle comprising:
a frame;
a side-by-side seating supported by the frame;
a plurality of ground engaging members supporting the frame, including a plurality of rear ground engaging members;
a power train supported by the frame, positioned rearward of the side-by-side seating, and operatively coupled to at least one of the plurality of ground engaging members by an output shaft to propel the vehicle;
a rear suspension comprising a trailing arm coupled to the frame and at least one of the rear ground engaging members, wherein the trailing arm is coupled to the frame at a position completely below of the power train; and
wherein a first ground engaging member of the plurality of rear ground engaging members defines a rotation axis, and the rotation axis is positioned below the power train, and the output shaft is positioned above and rearward of the rotation axis.

13. The vehicle of claim 12, further comprising a rear driving member operatively coupled to the plurality of rear ground engaging members, wherein the output shaft delivers a torque to the rear driving member.

14. The vehicle of claim 12 further comprising a rear drive member operatively coupled between the power train and the at least one of the plurality of ground engaging members, and a brake and a sprocket are positioned along the rear drive member and within a lateral extent of a rear portion of the frame, the sprocket delivering a torque to the rear drive member from the power train through a chain.

15. The vehicle of claim 12, wherein the power train comprises a power source, and the power source is positioned approximately horizontally, and is adjustably mounted to the frame.

16. A vehicle comprising:
a frame;
a side-by-side seating supported by the frame;
a plurality of ground engaging members supporting the frame, including a plurality of rear ground engaging members;
a rear independent suspension coupled to the frame and at least one of the rear ground engaging members; and
a power train supported by the frame including a power source, positioned rearward of the side-by-side seating, and operatively coupled to at least one of the plurality of ground engaging members to propel the vehicle, wherein the power source supplies a torque from an output shaft to a rear driving member through a chain, and the power source is adjustably mounted to the frame to maintain a tension within the chain.

17. The vehicle of claim 16, wherein the rear driving member is positioned below the power train.

18. The vehicle of claim 16, wherein the rear independent suspension comprises at least one trailing arm, and the at least one trailing arm is coupled to the frame below and forward of the power train.

19. The vehicle of claim 16, the rear independent suspension including a first radius rod and a second radius rod, and wherein the rear driving member is coupled to a first ground engaging member of the plurality of rear ground engaging members through a half shaft, the half shaft aligned approximately parallel with the first radius rod and the second radius rod and positioned forward of the first radius rod and the second radius rod.

20. The vehicle of claim 16, wherein an adjustable power source mount is positioned on the frame above the power train.

21. The vehicle of claim 16, wherein the rear independent suspension further includes a trailing arm coupled to the frame and the first ground engaging member of the plurality of rear ground engaging members.

22. A vehicle comprising:
a frame including a lower frame portion;
a side-by-side seating supported by the frame forward of the lower frame portion;
a plurality of ground engaging members supporting the frame, including a plurality of rear ground engaging members;
a rear suspension comprising a trailing arm coupled to the frame and at least one of the rear ground engaging members; and
a power train supported by the frame, the power train comprising a power source positioned rearward of the side-by-side seating, and operatively coupled to at least one of the plurality of ground engaging members to propel the vehicle, the power source coupled to the frame independent of the lower frame portion, wherein a rotation axis of the rear ground engaging members is positioned completely below the power train when the vehicle is in a rest state.

23. A vehicle comprising:
a frame;
a side-by-side seating supported by the frame;
a plurality of ground engaging members supporting the frame, including a plurality of rear ground engaging members;
a power train supported by the frame and operatively coupled to at least one of the plurality of ground engaging members through an output shaft; and
a rear suspension comprising a trailing arm rotatably coupled to the frame at a first mounting position and to at least one of the ground engaging members, and a lateral arm extending between a first end and a second end, the first end rotatably coupled to the frame at a second mounting position and the second end supported by at least one of the ground engaging members, wherein the second mounting position is forward of the output shaft.

24. The vehicle of claim 23, wherein the first mounting position is forward of the power train.

25. The vehicle of claim 23, wherein the output shaft is operatively coupled to at least one of the plurality of ground engaging members through a rear driving member, the rear driving member coupled to the output shaft through a drive chain.

26. The vehicle of claim 25, wherein the second mounting position is within a perimeter of the drive chain when viewed from a side view in a direction perpendicular to a plane defined by the perimeter of the drive chain.

27. A vehicle comprising:
a frame;
a side-by-side seating supported by the frame;
a plurality of ground engaging members supporting the frame, including a plurality of rear ground engaging members;
a power source supported by the frame, positioned rearward of the side-by-side seating, and operatively coupled to at least one of the plurality of ground engaging members to propel the vehicle;
a rear drive member operatively coupled between the powertrain and the at least one of the plurality of ground engaging members;
a brake member and a sprocket operatively coupled to the rear driving member and positioned within a rear portion of the frame, and the sprocket is configured to deliver torque to the rear driving member from the power source;
a rear suspension comprising a trailing arm coupled to the frame and at least one of the rear ground engaging members, wherein the trailing arm is coupled to the frame at a position completely below of the powertrain; and
wherein a first ground engaging member of the plurality of rear ground engaging members defines a rotational axis, and the rotational axis is positioned below the powertrain.

28. A vehicle comprising:
a frame;
a side-by-side seating supported by the frame;
a plurality of ground engaging members supporting the frame, including a plurality of rear ground engaging members;
a first rear suspension coupling a first ground engaging member of the plurality of ground engaging members to the frame and comprising a first trailing arm moveably coupled to the frame at a first location forward of a first rotational axis of the first ground engaging member and a first control arm moveably coupled to the frame at a second location rearward of the first rotational axis of the first ground engaging member;
a second rear suspension coupling a second ground engaging member of the plurality of ground engaging members to the frame and comprising a second trailing arm moveably coupled to the frame at a third location forward of a second rotational axis of the second ground engaging member and a second control arm moveably coupled to the frame at a fourth location rearward of the second rotational axis of the second ground engaging member; and
a power train supported by the frame, positioned rearward of the side-by-side seating, and operatively coupled to at least the first ground engaging member and the second ground engaging member of the plurality of ground engaging members through a rear driving member to propel the vehicle, wherein a rotation axis of the rear driving member is positioned completely below the power train, and an output shaft from the powertrain is positioned vertically above and closer to a rear end of the vehicle relative to the rotation axis.

29. A vehicle comprising:
a frame;
a side-by-side seating supported by the frame;
a plurality of ground engaging members supporting the frame, including a plurality of rear ground engaging members;
a first rear suspension coupling a first ground engaging member of the plurality of ground engaging members to the frame and comprising a first trailing arm moveably coupled to the frame at a first location forward of a first rotational axis of the first ground engaging member and a first control arm moveably coupled to the frame at a second location rearward of the first rotational axis of the first ground engaging member;
a second rear suspension coupling a second ground engaging member of the plurality of ground engaging members to the frame and comprising a second trailing arm moveably coupled to the frame at a third location forward of a second rotational axis of the second ground engaging member and a second control arm moveably coupled to the frame at a fourth location rearward of the second rotational axis of the second ground engaging member;
a power train supported by the frame, positioned rearward of the side-by-side seating, and operatively coupled to at least the first ground engaging member and the second ground engaging member of the plurality of ground engaging members through a rear driving member to propel the vehicle, wherein a rotation axis of the rear driving member is positioned completely below the power train; and
wherein the rear driving member is a jackshaft coupled to an output shaft of the power train, wherein the output shaft is operatively coupled to the jackshaft to cause a rotation of the jackshaft and the jackshaft is operatively coupled to the rear ground engaging members to cause a rotation of the rear ground engaging members.

* * * * *